US010535872B2

(12) United States Patent
Matsuno et al.

(10) Patent No.: US 10,535,872 B2
(45) Date of Patent: Jan. 14, 2020

(54) NEGATIVE ELECTRODE ACTIVE MATERIAL FOR NON-AQUEOUS ELECTROLYTE SECONDARY BATTERY, NEGATIVE ELECTRODE FOR NON-AQUEOUS ELECTROLYTE SECONDARY BATTERY, NON-AQUEOUS ELECTROLYTE SECONDARY BATTERY, AND METHOD OF PRODUCING NEGATIVE ELECTRODE ACTIVE MATERIAL PARTICLES

(71) Applicant: SHIN-ETSU CHEMICAL CO., LTD., Tokyo (JP)

(72) Inventors: Takumi Matsuno, Annaka (JP); Hiromichi Kamo, Takasaki (JP); Takakazu Hirose, Annaka (JP); Hiroki Yoshikawa, Takasaki (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 49 days.

(21) Appl. No.: 15/575,183

(22) PCT Filed: Apr. 21, 2016

(86) PCT No.: PCT/JP2016/002127
§ 371 (c)(1),
(2) Date: Nov. 17, 2017

(87) PCT Pub. No.: WO2016/194288
PCT Pub. Date: Dec. 8, 2016

(65) Prior Publication Data
US 2018/0151873 A1 May 31, 2018

(30) Foreign Application Priority Data

Jun. 2, 2015 (JP) .................................. 2015-112085

(51) Int. Cl.
*H01M 4/13* (2010.01)
*H01M 4/36* (2006.01)
*H01M 4/48* (2010.01)
*H01M 4/58* (2010.01)
*H01M 4/02* (2006.01)

(52) U.S. Cl.
CPC ........... *H01M 4/366* (2013.01); *H01M 4/483* (2013.01); *H01M 4/5825* (2013.01); *H01M 2004/021* (2013.01); *H01M 2004/027* (2013.01)

(58) Field of Classification Search
CPC .... H01M 4/366; H01M 4/0459; H01M 4/483; H01M 4/5825; H01M 4/583; H01M 4/625; H01M 4/1391; H01M 10/052; H01M 10/0525; H01M 2004/021; H01M 2004/027; H01M 2220/30
See application file for complete search history.

(56) References Cited

U.S. PATENT DOCUMENTS

| 5,395,711 A | 3/1995 | Tahara et al. |
| 7,459,236 B2 | 12/2008 | Konishiike et al. |
| 8,377,592 B2 | 2/2013 | Jeong et al. |
| 2006/0099507 A1 | 5/2006 | Kogetsu et al. |
| 2008/0176137 A1 | 7/2008 | Endo et al. |
| 2009/0202911 A1 | 8/2009 | Fukuoka et al. |
| 2010/0009261 A1 | 1/2010 | Watanabe |
| 2015/0125744 A1 | 5/2015 | Hosaka et al. |
| 2015/0263339 A1* | 9/2015 | Kouzu ................. H01M 4/131 429/231.4 |
| 2016/0233484 A1 | 8/2016 | Hirose et al. |
| 2016/0254525 A1 | 9/2016 | Hirose et al. |

FOREIGN PATENT DOCUMENTS

| CN | 103647056 A | 3/2014 |
| CN | 104638268 A | 5/2015 |
| JP | 2997741 B2 | 1/2000 |
| JP | 2001-185127 A | 7/2001 |
| JP | 2002-042806 A | 2/2002 |
| JP | 2006-114454 A | 4/2006 |
| JP | 2006-164954 A | 6/2006 |

(Continued)

OTHER PUBLICATIONS

May 29, 2018 Office Action issued in Japanese Patent Application No. 2015-112085.
Dec. 5, 2017 International Preliminary Report on Patentability issued in International Patent Application No. PCT/JP2016/002127.
Nguyen, Cao Cuong et al. "Roles of Oxygen and Interfacial Stabilization in Enhancing the Cycling Ability of Silicon Dxide Anodes for Rechargeable Lithium Batteries". Journal of the Electrochemical Society, vol. 160., p. A906-A914, 2013.

(Continued)

*Primary Examiner* — Raymond Alejandro
(74) *Attorney, Agent, or Firm* — Oliff PLC

(57) ABSTRACT

A negative electrode active material that includes negative electrode active material particles that contain a silicon compound that contains a Li compound. The silicon compound is at least partially coated with a carbon coating, and the negative electrode active material particles are coated with a coating composed of at least one of a compound having a boron-fluorine bond and a compound having a phosphorous-fluorine bond on at least a part of the surface of either or both of the silicon compound and the carbon coating. The negative electrode active material particles contain a boron or a phosphorous element in a range of 10 to 10000 ppm by mass with respect to the total amount of negative electrode active material particles. These features can provide for a negative electrode active material that can increase battery capacity and improve cycle performance in a non-aqueous electrolyte secondary battery.

14 Claims, 2 Drawing Sheets

(56) References Cited

FOREIGN PATENT DOCUMENTS

| | | |
|---|---|---|
| JP | 2007-234255 A | 9/2007 |
| JP | 2008-177346 A | 7/2008 |
| JP | 2008-251369 A | 10/2008 |
| JP | 2008-282819 A | 11/2008 |
| JP | 2009-070825 A | 4/2009 |
| JP | 2009-205950 A | 9/2009 |
| JP | 2009-212074 A | 9/2009 |
| JP | 2012-164624 A | 8/2012 |
| JP | 2013-513206 A | 4/2013 |
| WO | 2011/068767 A1 | 6/2011 |
| WO | 2014/065417 A1 | 5/2014 |
| WO | 2015/025443 A1 | 2/2015 |
| WO | 2015/063979 A1 | 5/2015 |

OTHER PUBLICATIONS

Nagai, Ryo et al. "Development of Highly Reliable High-capacity Batteries for Mobile Devices and Small- to Medium-sized Batteries for Industrial Applications". Hitachi Review, vol. 60., p. 28-32, 2011.

Jan. 2, 2019 Extended European Search Report issued in European Patent Application No. 16802735.7.

Aug. 2, 2016 International Search Report issued in International Application No. PCT/JP2016/002127.

* cited by examiner

[FIG. 1]
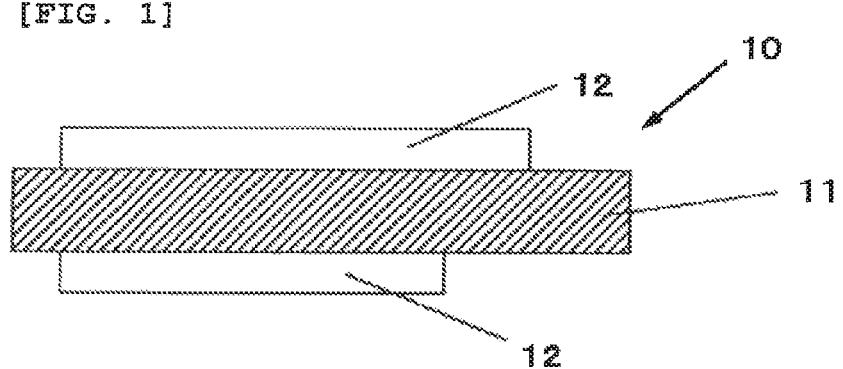
[FIG. 2]
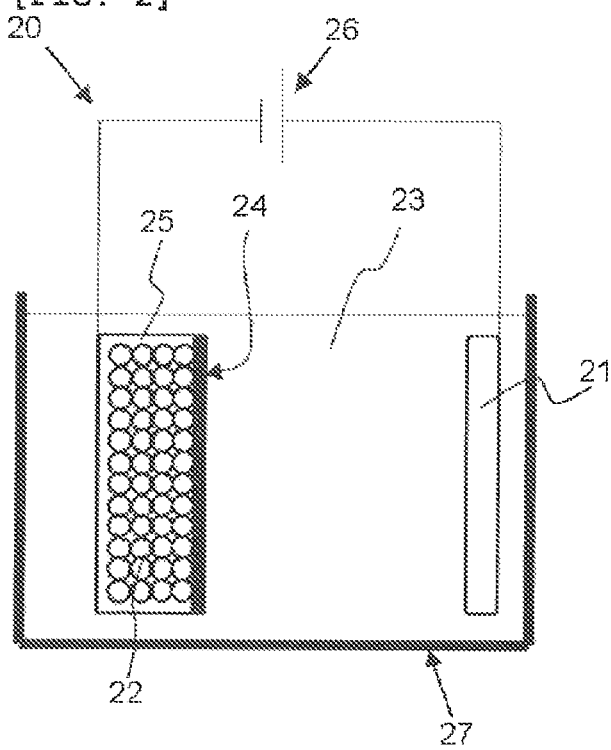

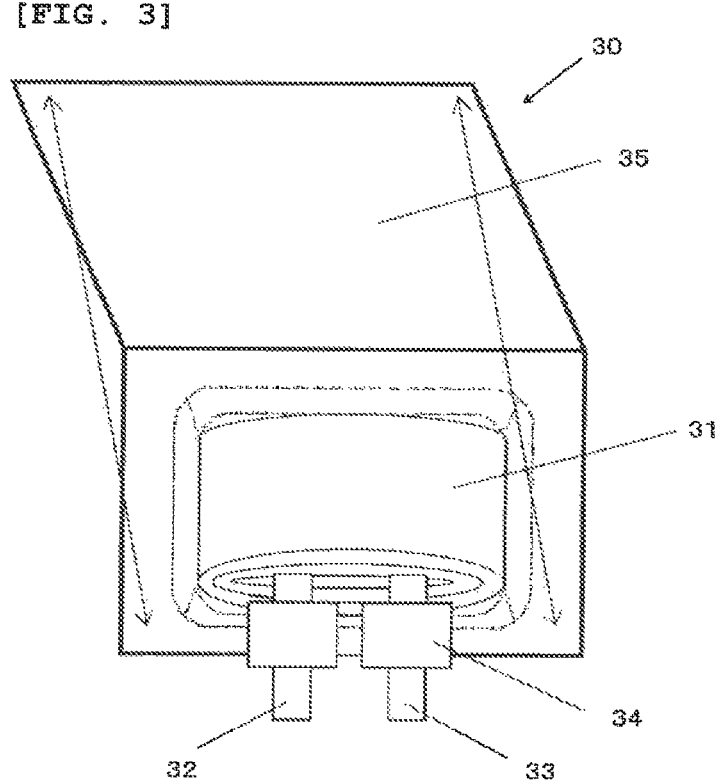

NEGATIVE ELECTRODE ACTIVE MATERIAL FOR NON-AQUEOUS ELECTROLYTE SECONDARY BATTERY, NEGATIVE ELECTRODE FOR NON-AQUEOUS ELECTROLYTE SECONDARY BATTERY, NON-AQUEOUS ELECTROLYTE SECONDARY BATTERY, AND METHOD OF PRODUCING NEGATIVE ELECTRODE ACTIVE MATERIAL PARTICLES

TECHNICAL FIELD

The present invention relates to a negative electrode active material for a non-aqueous electrolyte secondary battery, a negative electrode for a non-aqueous electrolyte secondary battery, and a non-aqueous electrolyte secondary battery, as well as a method of producing negative electrode active material particles.

BACKGROUND ART

In recent years, small electronic devices, represented by mobile terminals, have been widely used and urgently required to reduce the size and weight and to increase the life. Such requirement has advanced the development of particularly small, lightweight secondary batteries with higher energy density. These secondary batteries are considered to find application not only for small electronic devices but for large electronic devices such as, typically, automobiles as well as power storage systems such as, typically, houses.

Among those, lithium-ion secondary batteries are easy to reduce the size and increase the capacity and have higher energy density than those of lead or nickel-cadmium batteries, receiving considerable attention.

The lithium-ion secondary battery has positive and negative electrodes, a separator, and an electrolyte. The negative electrode includes a negative electrode active material related to charging and discharging reactions.

A negative electrode active material, which is usually made of a carbon material, is required to further improve the battery capacity for recent market requirement. Use of silicon as a negative electrode active material is considered to improve the battery capacity, for silicon has a theoretical capacity (4199 mAh/g) ten times larger than does graphite (372 mAh/g). Such a material is thus expected to significantly improve the battery capacity. The development of silicon materials for use as negative electrode active materials includes not only silicon as a simple but also alloy thereof and a compound thereof such as typically oxides. The consideration of active material shapes for carbon materials ranges from a standard application type to an integrated type in which the materials are directly deposited on a current collector.

Use of silicon as a main material of a negative electrode active material, however, expands or shrinks a negative electrode active material particle when charging or discharging, thereby making the negative electrode active material particle easy to break particularly near its surface layer. In addition, this active material particle produces ionic substances in its interior and is thus easy to break. The breakage of the surface layer of the negative electrode active material creates a new surface, increasing a reaction area of the active material. The new surface then causes the decomposition reaction of an electrolyte and is coated with a decomposition product of the electrolyte, thereby consuming the electrolyte. This makes the cycle performance easy to reduce.

Various materials and configurations of a negative electrode for a lithium-ion secondary battery mainly using a silicon material have been considered to improve the initial efficiency and the cycle performance of the battery.

More specifically, a vapor deposition method is used to deposit silicon and amorphous silicon dioxide simultaneously so that better cycle performance and greater safety are achieved (See Patent Document 1, for example). Moreover, a carbon material (an electronic conduction material) is disposed on the surface of silicon oxide particles so that a higher battery capacity and greater safety are achieved (See Patent Document 2, for example). Moreover, an active material including silicon and oxygen is produced to form an active material layer having a higher ratio of oxygen near a current collector so that improved cycle performance and higher input-output performance are achieved (See Patent Document 3, for example). Moreover, silicon active material is formed so as to contain oxygen with an average content of 40 at % or less and with a higher oxygen content near a current collector so that improved cycle performance is achieved (See Patent Document 4, for example).

Moreover, a nano-complex including Si-phase, $SiO_2$, $M_yO$ metal oxide is used to improve the first charge and discharge efficiency (See Patent Document 5, for example). Moreover, a Li containing material is added to a negative electrode, and pre-doping that decompose Li and moves the Li to a positive electrode at a higher negative-electrode potential so that the first charge and discharge efficiency is improved (See Patent Document 6, for example).

Moreover, $SiO_x$ ($0.8 \leq x \leq 1.5$, the particle size=1 μm to 50 μm) and a carbon material are mixed and calcined at a high temperature so that improved cycle performance is achieved (See Patent Document 7, for example). Moreover, a mole ratio of oxygen to silicon in a negative electrode active material is adjusted in the range from 0.1 to 1.2 so as to hold a difference between the maximum and the minimum of the oxygen-to-silicon mole ratio near the interface between the active material and a current collector at 0.4 or less, so that improved cycle performance is achieved (See Patent Document 8, for example). Moreover, a metal oxide containing lithium is used to improve the battery load characteristic (See Patent Document 9, for example). Moreover, a hydrophobic layer such as a silane compound is formed in the surface layer of a silicon material so that improved cycle performance is achieved (See Patent Document 10, for example).

Moreover, a silicon oxide is used and coated with graphite to give electric conductivity so that improved cycle performance is achieved (See Patent Document 11, for example). Patent Document 11 describes that a shift value of the graphite coating, which is obtained from a Raman spectrum, has broad peaks at 1330 $cm^{-1}$ and 1580 $cm^{-1}$ and a ratio $I_{1330}/I_{1580}$ of its intensity shows $1.5 < I_{1330}/I_{1580} < 3$.

Moreover, a particle having a silicon microcrystal phase dispersing in a silicon dioxide is used to achieve a higher battery capacity and improved cycle performance (See Patent Document 12, for example). Finally, a silicon oxide having a silicon-to-oxygen atomicity ratio of 1:y ($0 < y < 2$) is used to improve overcharge and overdischarge performance (See Patent Document 13, for example).

CITATION LIST

Patent Literature

Patent Document 1: Japanese Unexamined Patent publication (Kokai) No. 2001-185127
Patent Document 2: Japanese Unexamined Patent publication (Kokai) No. 2002-042806
Patent Document 3: Japanese Unexamined Patent publication (Kokai) No. 2006-164954
Patent Document 4: Japanese Unexamined Patent publication (Kokai) No. 2006-114454
Patent Document 5: Japanese Unexamined Patent publication (Kokai) No. 2009-070825
Patent Document 6: Japanese Unexamined Patent publication (Kohyo) No. 2013-513206
Patent Document 7: Japanese Unexamined Patent publication (Kokai) No. 2008-282819
Patent Document 8: Japanese Unexamined Patent publication (Kokai) No. 2008-251369
Patent Document 9: Japanese Unexamined Patent publication (Kokai) No. 2008-177346
Patent Document 10: Japanese Unexamined Patent publication (Kokai) No. 2007-234255
Patent Document 11: Japanese Unexamined Patent publication (Kokai) No. 2009-212074
Patent Document 12: Japanese Unexamined Patent publication (Kokai) No. 2009-205950
Patent Document 13: Japanese Patent No. 2997741

SUMMARY OF INVENTION

Technical Problem

As described previously, small electronic devices, represented by mobile devices, have been developed to improve their performance and increase their functions in recent years. Non-aqueous electrolyte secondary batteries, especially lithium-ion secondary batteries, which are used as main sources of the devices, have been required to increase the battery capacity. The development of non-aqueous electrolyte secondary batteries including negative electrodes mainly using silicon materials have been desired to solve this problem. The non-aqueous electrolyte secondary batteries using silicon materials need similar cycle performance to non-aqueous electrolyte secondary batteries using carbon materials.

The present invention was accomplished in view of the above problems, and an object thereof is to provide a negative electrode active material for a non-aqueous electrolyte secondary battery that can increase the battery capacity and improve the cycle performance and the battery initial efficiency. Another object of the present invention is to provide a negative electrode for a non-aqueous electrolyte secondary battery using the negative electrode active material and a non-aqueous electrolyte secondary battery using the negative electrode. Further object of the present invention is to provide a method of producing negative electrode active material particles that can be used for the above negative electrode.

Solution to Problem

To achieve the objects, the present invention provides a negative electrode active material for a non-aqueous electrolyte secondary battery, including:

negative electrode active material particles that contain a silicon compound ($SiO_x$: $0.5 \leq x \leq 1.6$) containing a Li compound;
wherein the silicon compound is at least partially coated with a carbon coating,
the negative electrode active material particles are coated with a coating composed of at least one compound selected from the group consisting of a compound having a boron-fluorine bond and a compound having a phosphorous-fluorine bond, with the coating being contained on at least a part of a surface of either or both of the silicon compound and the carbon coating,
the negative electrode active material particles contain a boron element or a phosphorous element in a range of 10 ppm by mass to 10000 ppm by mass with respect to a total amount of the negative electrode active material particles.

The inventive negative electrode active material, having negative electrode active material particles that contain a silicon compound (hereinafter, also referred to as silicon-based active material particles), exhibits high battery capacity. In the silicon compound, a $SiO_2$ component part, which is destabilized with insertion and extraction of lithium when charging and discharging of a battery, is previously modified into another Li compound. Accordingly, irreversible capacity generated at charging can be reduced. Moreover, the carbon coating makes it possible to exhibit appropriate electric conductivity and improve the capacity retention rate and the first efficiency. With the coating containing a compound having a boron-fluorine bond or a compound having a phosphorous-fluorine bond, it is possible to prevent decomposition of a supporting salt contained in an electrolyte of a battery to improve capacity retention rate. When the boron element or the phosphorous element is contained in an amount of 10 ppm by mass or more with respect to the total amount of the silicon-based active material particles, it is possible to achieve the foregoing effect of preventing decomposition of a supporting salt. When the boron element or the phosphorous element is contained in an amount of 10000 ppm by mass or less with respect to the total amount of the silicon-based active material particles, lowering of the electric conductivity can be prevented.

It is preferred that the negative electrode active material particles contain a boron element or a phosphorous element in a range of 500 ppm by mass to 5000 ppm by mass with respect to the total amount of the negative electrode active material particles.

When the amount of boron element or phosphorous element is 500 ppm by mass or more with respect to the total amount of the silicon-based active material particles, it is possible to achieve the foregoing effect of preventing decomposition of a supporting salt more effectively. When the boron element or the phosphorous element is contained in an amount of 5000 ppm by mass or less with respect to the total amount of the silicon-based active material particles, lowering of the battery capacity can be prevented in addition to prevention of the lowering of the electric conductivity of the negative electrode active material.

It is preferred that the negative electrode active material particles contain at least one selected from the group consisting of an alkali metal, an alkaline earth metal, and a salt thereof.

The above negative electrode active material, with the alkali metal and the alkaline earth metal having high affinity with a binder used in producing a negative electrode, can produce a negative electrode in which the negative electrode active material layer and the negative electrode current collector are highly adhered, and capacity retention rate can be improved.

It is preferred that the negative electrode active material particles contain at least one selected from the group consisting of sodium, potassium, and a salt thereof as the alkali metal, and the sodium element or the potassium element is contained in a range of 10 ppm by mass to 200 ppm by mass on an individual basis with respect to the total amount of the negative electrode active material particles.

When the silicon-based active material particles contains the foregoing alkali metal in such a content, it is possible to produce a negative electrode in which the negative electrode active material layer hardly exfoliates, while retaining the lithium conductivity of the coating on the surface of the silicon compound.

It is preferred that the negative electrode active material particles contain at least one selected from the group consisting of magnesium, calcium, and a salt thereof as the alkaline earth metal, and the magnesium element or the calcium element is contained in a range of 5 ppm by mass to 50 ppm by mass with respect to the total amount of the negative electrode active material particles.

When the silicon-based active material particles contains the foregoing alkaline earth metal in such a content, it is possible to produce a negative electrode in which the negative electrode active material layer hardly exfoliates, while retaining the lithium conductivity of the coating on the surface of the silicon compound.

It is preferred that one or more of the surface of the silicon compound, the surface of the carbon coating, and the surface of coating composed of at least one compound selected from the group consisting of a compound having a boron-fluorine bond and a compound having a phosphorous-fluorine bond contain aluminum oxide, and an aluminum element be contained in a range of 50 ppm to 500 ppm with respect to the total amount of the negative electrode active material particles.

The above negative electrode active material, having aluminum oxide with excellent chemical stability, makes it possible to produce slurry with good coating property in producing a negative electrode. It can also improve the safety in charging and discharging of a battery since aluminum oxide is excellent in durability and thermal stability. When an aluminum element is contained in such a range, it is possible to exhibit the foregoing effect of improving coating property and safety of a battery while retaining electric conductivity of the negative electrode active material.

It is preferred that the negative electrode active material particles contain at least one selected from the group consisting of chromium, iron, and copper in a range of 10 ppm by mass to 500 ppm by mass with respect to the total amount of the negative electrode active material particles.

The above negative electrode active material, containing a metal element with high electric conductivity as described above, can improve the electric conductivity. The foregoing content makes it possible to improve the electric conductivity while preventing formation of alloy with silicon.

It is preferred that the negative electrode active material particles contain an acid and a Li salt thereof, and the acid and the Li salt thereof are on the outer periphery of the carbon coating.

When the silicon-based active material particles contain an acid and a Li salt thereof, it is possible to neutralize an alkaline component eluted from the silicon compound that contains Li compound in producing slurry to retain the pH of the slurry to an appropriate value for coating an electrode. The Li salt of the acid exhibits an effect to make the negative electrode active material liable to be blended to water and binder. In a negative electrode, the acid and the Li salt thereof are desirably contained around the silicon compound mainly. When they are in a position closer to the silicon compound in a negative electrode, an effect for improving the battery performances is more enhanced. When the acid and the Li salt are on the outer periphery of the carbon coating, in particular, such an effect can be remarkable.

It is preferred that the silicon compound contain in its interior at least one Li compound selected from the group consisting of $Li_2SiO_3$, $Li_6Si_2O_7$, $Li_4SiO_4$.

The irreversible capacity generated at charging can be reduced by using the negative electrode active material containing a silicon compound with the $SiO_2$ component part, which is destabilized with insertion and extraction of lithium, being previously modified into such a relatively stable lithium compound(s).

It is preferred that the negative electrode active material particles be produced by a process including an electrochemical method.

When the silicon-based active material particles that contain a silicon compound containing a Li compound are produced by a process including an electrochemical method, a more stable Li compound can be obtained, and the battery performances can be more improved.

It is preferred that the carbon coating exhibit scattering peaks at 1330 $cm^{-1}$ and 1580 $cm^{-1}$ in Raman spectrometry and satisfies $0.7<I_{1330}/I_{1580}<2.0$ where $I_{1330}/I_{1580}$ is a ratio of an intensity of the scattering peak at 1330 $cm^{-1}$ to that at 1580 $cm^{-1}$.

The carbon coating having a ratio of an intensity of $I_{1330}/I_{1580}$ in such a range makes it possible to optimize the ratio between carbon material with a diamond structure and carbon material with a graphite structure contained to improve the battery performances such as capacity retention rate and first efficiency.

It is preferred that a content of the carbon coating be 5.0% by mass or more and 20% by mass or less with respect to a mass of the negative electrode active material particles.

When the carbon coating is contained in such a ratio, it is possible to contain a silicon compound with high capacity in an appropriate ratio to secure sufficient battery capacity.

It is preferred that the silicon compound exhibit a diffraction peak having a half width (2θ) of 1.2° or more, the diffraction peak being attributable to a (111) crystal face and obtained by X-ray diffraction, and a crystallite size attributable to the crystal face is 7.5 nm or less.

This silicon compound, which exhibits the above half width and crystallite size, has low crystallinity. Use of the silicon compound having low crystallinity, which has a few Si crystal, enables improvement in the battery performances.

It is preferred that the silicon compound have a median size of 0.5 μm or more and 20 μm or less.

The negative electrode active material containing a silicon compound with such a median size can improve the capacity retention rate and the first efficiency.

To achieve the foregoing objects, the present invention also provides a negative electrode for a non-aqueous electrolyte secondary battery including any of a negative electrode active material for a non-aqueous electrolyte secondary battery described above and a carbon-based active material.

Such a negative electrode for a non-aqueous electrolyte secondary battery can improve the first efficiency and the capacity retention rate while increasing the capacity of the negative electrode.

It is preferred that a ratio of the negative electrode active material for a non-aqueous electrolyte secondary battery be 5% by mass or more with respect to a total amount of the carbon-based active material and the negative electrode active material for a non-aqueous electrolyte secondary battery.

The above negative electrode can improve volume energy density of a battery.

To achieve the foregoing objects, the present invention also provides a non-aqueous electrolyte secondary battery including any of a negative electrode for a non-aqueous electrolyte secondary battery described above.

The non-aqueous electrolyte secondary battery that uses the inventive negative electrode can be a secondary battery with higher capacity as well as good cycle performances and first efficiency.

To achieve the foregoing objects, the present invention also provides a method of producing negative electrode active material particles contained in a negative electrode material for a non-aqueous electrolyte secondary battery, including the steps of:

producing a silicon compound shown by the general formula of $SiO_x$ ($0.5 \leq x \leq 1.6$), forming a carbon coating on at least a part of a surface of the silicon compound, modifying the silicon compound by inserting Li into the silicon compound to form a Li compound on either or both of the surface and the interior of the silicon compound, and coating at least a part of the surface of either or both of the silicon compound and the carbon coating with a coating composed of at least one compound selected from the group consisting of a compound having a boron-fluorine bond and a compound having a phosphorous-fluorine bond, wherein the surface is coated with the coating composed of at least one compound selected from the group consisting of a compound having a boron-fluorine bond and a compound having a phosphorous-fluorine bond in such a way that a boron element or a phosphorous element is contained in a range of 10 ppm by mass to 10000 ppm by mass with respect to a total amount of the negative electrode active material particles.

The method of producing negative electrode active material particles including the above steps makes it possible to stably give silicon-based active material particles, contained in the inventive negative electrode active material, which can increase the battery capacity and improve the cycle performances and the battery initial efficiency.

It is preferred that the step of modifying the silicon compound be performed by an electrochemical method.

Use of an electrochemical method to modify the silicon compound makes it possible to obtain a more stable Li compound and to further improve the battery performances.

It is preferred that the coating composed of at least one compound selected from the group consisting of a compound having a boron-fluorine bond and a compound having a phosphorous-fluorine bond be formed simultaneously with modifying the silicon compound by the electrochemical method in the step of modifying the silicon compound.

When the coating is formed simultaneously with the modification by an electrochemical method, it becomes easy to control the amount of forming the coating and to control the content of a boron element or a phosphorous element by altering the modification conditions.

Advantageous Effects of Invention

The inventive negative electrode active material can increase the battery capacity and improve the cycle performances and the battery initial efficiency. The negative electrode and the non-aqueous electrolyte secondary battery using this negative electrode active material also can achieve the same effect.

The inventive method of producing negative electrode active material particles makes it possible to stably give silicon-based active material particles contained in the inventive negative electrode active material.

BRIEF DESCRIPTION OF DRAWINGS

FIG. 1 is a cross-sectional view of an example of configuration of a negative electrode for a non-aqueous electrolyte secondary battery according to the present invention;

FIG. 2 is a simplified view of a bulk modification apparatus that can be used for modifying a silicon compound contained in the inventive negative electrode for a non-aqueous electrolyte secondary battery; and FIG. 3 is an exploded view of an example of configuration of a secondary battery (a laminate film type) using the inventive negative electrode for a non-aqueous electrolyte secondary battery.

DESCRIPTION OF EMBODIMENTS

Hereinafter, embodiments of the present invention will be described, but the present invention is not limited thereto.

As described previously, use of a negative electrode mainly made of a silicon material, for use in a non-aqueous electrolyte secondary battery, has been considered to increase the capacity of the non-aqueous electrolyte secondary battery.

The non-aqueous electrolyte secondary battery using a silicon material is required to have similar cycle performance to a non-aqueous electrolyte secondary battery using a carbon material; however, no one has yet proposed a negative electrode material for this type of battery having similar cycle stability to a non-aqueous electrolyte secondary battery using a carbon material. In addition, a silicon compound especially containing oxygen has a lower first efficiency than that of any carbon material, thereby limiting improvement in battery capacity.

In view of this, the present inventors diligently conducted study on a negative electrode active material that allows a non-aqueous secondary battery using a negative electrode made of this material to have better cycle performance, safety, and first efficiency, thereby bringing the present invention to completion.

The inventive negative electrode active material for a non-aqueous electrolyte secondary battery includes negative electrode active material particles that contain a silicon compound ($SiO_x$: $0.5 \leq x \leq 1.6$) containing a Li compound. In this negative electrode active material, the silicon compound is at least partially coated with a carbon coating, and contain a coating composed of at least one of a compound having a boron-fluorine bond and a compound having a phosphorous-fluorine bond on at least a part of the surface of the silicon compound or the carbon coating. The silicon-based active material particles contain a boron element or a phosphorous element in a range of 10 ppm by mass to 10000 ppm by mass with respect to the total amount of the negative electrode active material particles. When the negative electrode active material particles contain both of a boron element and a phosphorous element, the negative electrode active material particles contain a boron element and a phosphorous element in a total range of 10 ppm by mass to 10000 ppm by mass in total with respect to the total amount of the negative electrode active material particles.

The above negative electrode active material, having negative electrode active material particles that contain a silicon compound (also referred to as silicon-based active material particles), exhibits high battery capacity. In the silicon compound, a $SiO_2$ component part, which is destabilized with insertion and extraction of lithium when charging and discharging of a battery, is previously modified into another Li compound. Accordingly, irreversible capacity generated at charging can be reduced. Moreover, the carbon coating makes it possible to exhibit appropriate electric conductivity and improve capacity retention rate and first efficiency. With the coating containing a compound having a boron-fluorine bond or a compound having a phosphorous-fluorine bond, it is possible to prevent decomposition of a supporting salt contained in an electrolyte of a battery to improve the capacity retention rate. When the boron element or the phosphorous element is contained in an amount of 10 ppm by mass or more with respect to the total amount of the silicon-based active material particles, it is possible to achieve the foregoing effect of preventing decomposition of a supporting salt. When the boron element or the phosphorous element is contained in an amount of 10000 ppm by mass or less with respect to the total amount of the silicon-based active material particles, lowering of the electric conductivity can be prevented.

<1. Negative Electrode for Non-Aqueous Electrolyte Secondary Battery>

A negative electrode for a non-aqueous electrolyte secondary battery using the inventive negative electrode active material for a non-aqueous electrolyte secondary battery will be now described. FIG. 1 shows the cross-sectional configuration of a negative electrode for a non-aqueous electrolyte secondary battery (simply referred to as "a negative electrode" below) according to an embodiment of the invention.

[Configuration of Negative Electrode]

As shown in FIG. 1, the negative electrode 10 has a negative electrode active material layer 12 on a negative electrode current collector 11. The negative electrode active material layer 12 may be disposed on one side or both sides of the negative electrode current collector 11. The negative electrode current collector 11 is not necessarily needed in a negative electrode using the inventive negative electrode active material.

[Negative Electrode Current Collector]

The negative electrode current collector 11 is made of a highly electric conductive and mechanically strong material. Examples of the conductive material used for the negative electrode current collector 11 include copper (Cu) and nickel (Ni). Such electric conductive materials preferably have inability to form an intermetallic compound with lithium (Li).

The negative electrode current collector 11 preferably contains carbon (C) and sulfur (S) besides the main element because these elements improve the physical strength of the negative electrode current collector. In particular, when the active material layer contains an active material layer expandable at charging, the current collector containing the above elements can inhibit deformation of the electrodes and the current collector itself. The amount of the contained elements is preferably, but not particularly limited to, 100 ppm or less. This amount enables effective inhibition of the deformation.

The surface of the negative electrode current collector 11 may or may not be roughed. Examples of the negative electrode current collector roughened include a metallic foil subjected to an electrolyzing process, an embossing process, or a chemical etching process. Examples of the negative electrode current collector that is not roughened include a rolled metallic foil.

[Negative Electrode Active Material Layer]

The negative electrode active material layer 12 may contain a plurality kind of negative electrode active materials such as carbon-based active material in addition to the silicon-based active material particles. It may further contain other materials such as a negative electrode binder or a conductive additive depending on battery design. The inventive negative electrode active material can be a material to form this negative electrode active material layer 12.

As described above, the inventive negative electrode active material includes silicon-based active material particles that contain a silicon compound ($SiO_x$: $0.5 \leq x \leq 1.6$) containing a Li compound.

The silicon-based active material particles in the present invention each contain a silicon compound that can occlude and emit lithium ions. The Li ions contained in this silicon compound are contained in either or both of the surface and the interior of the silicon compound.

As described above, the negative electrode active material particles contain a silicon compound composed of $SiO_x$ ($0.5 \leq x \leq 1.6$). This silicon compound is a silicon oxide material ($SiO_x$: $0.5 \leq x \leq 1.6$), in which composition the x is preferably close to 1. The reason is that this composition enables high cycle performance. The present invention does not necessarily intend a silicon material composition with a purity of 100% but permits a silicon material containing a minute amount of impurities.

The silicon compound containing a Li compound can be obtained by selectively modifying a part of a $SiO_2$ component formed in the interior of the silicon compound into the Li compound before charging and discharging. The above method for selectively producing a compound, that is, the modification of the silicon compound is preferably performed by an electrochemical method.

The silicon-based active material particles produced by using the modification (bulk modification) method in an electrochemical manner, in which changing of the Si domain to a Li compound can be reduced or prevented, can be a substance that is stable in the atmosphere, aqueous slurry, and solvent slurry. Moreover, electrochemical modification enables production of a more stable substance than thermal modification (thermal doping method), in which the compound is randomly modified.

In the present invention, the silicon compound preferably contains in its interior at least one Li compound selected from $Li_2SiO_3$, $Li_6Si_2O_7$, $Li_4SiO_4$. $Li_4SiO_4$, $Li_6Si_2O_7$, and $Li_2SiO_3$ can improve the performance when at least one of them is formed in a bulk of the silicon compound, and the combination of two or more of them can further improve the performance.

In the present invention, the silicon compound preferably contains on its surface at least one lithium compound selected from LiF, $Li_2CO_3$, $Li_2O$, and LiOH.

These selective compounds can be produced by subjecting the lithium counter electrode to electric potential regulation or electric current regulation to alter the modifying conditions in the electrochemical method. The Li in the silicon compound can be quantified by Nuclear Magnetic Resonance (NMR) and X-ray Photoelectron Spectroscopy (XPS). XPS and NMR measurements can be performed, for example, under the following conditions.

XPS
  Apparatus: an X-ray photoelectron spectroscopy apparatus
  X-ray Source: a monochromatic Al—Kα ray
  X-ray Spot Diameter: 100 μm
  Ar-ion Sputtering Gun Conditions: 0.5 kV, 2 mm×2 mm $^{29}$Si-MAS-NMR (Magic Angle Spinning-Nuclear Magnetic Resonance)
  Apparatus: a 700-NMR spectroscope made by Bruker Corp.
  Probe: a 4-mm-HR-MAS rotor, 50 μL
  Sample Rotation Speed: 10 kHz
  Temperature of Measurement Environment: 25° C.

As described above, the silicon compound in the silicon-based active material particles contains carbon coating on at least a part of the surface in the present invention, and can give appropriate electric conductivity thereby.

Moreover, the silicon-based active material particles contained in the inventive negative electrode active material contains a coating composed of at least one compound selected from a compound having a boron-fluorine bond and a compound having a phosphorous-fluorine bond on at least a part of the surface of either or both of the silicon compound and the carbon coating. That is, the coating composed of at least one compound selected from a compound having a boron-fluorine bond and a compound having a phosphorous-fluorine bond is contained on the surface of the silicon compound where the carbon coating is not formed and/or on the carbon coating formed on the surface of the silicon compound. This makes it possible to prevent decomposition of a supporting salt contained in the electrolyte in the battery to improve the capacity retention rate when the silicon-based active material containing the above silicon-based active material particles is used for a negative electrode. It is to be noted that the location of this coating can be determined by using transmission electron microscope-energy dispersive X-ray spectroscopy (TEM-EDX), for example.

Illustrative examples of the compound having a boron-fluorine bond include a salt of tetrafluoroborate ion, boron trifluoride, and organoboron polymer, as well as a decomposed product such as BxOyFz (x, y, and z are coefficients). Illustrative examples of the compound having a phosphorous-fluorine bond include a salt of hexafluorophosphate ion, phosphorus pentafluoride, organophosphorus polymer, as well as a decomposed product such as PxOyFz (x, y, and z are coefficients). Illustrative examples of a supporting salt contained in the foregoing electrolyte include lithium tetrafluoroborate and lithium hexafluorophosphate.

The boron-fluorine bond and the phosphorous-fluorine bond can be quantified by XPS. The measuring conditions can be the same conditions as in detecting a Li compound described above.

In the present invention, the silicon-based active material particles contain a boron element or a phosphorous element in a concentration ranging from 10 ppm by mass to 10000 ppm by mass with respect to the total amount of the silicon-based active material particles. The concentration is preferably in a range of 500 ppm by mass to 5000 ppm by mass. When this concentration is 10 ppm by mass or more, it is possible to exhibit an effect of preventing decomposition of a supporting salt in the electrolyte. When the concentration is 10000 ppm by mass or less, it is possible to prevent lowering of the electric conductivity. When this concentration is 500 ppm by mass or more, it is possible to exhibit the effect of preventing decomposition of a supporting salt more effectively. When the concentration is 5000 ppm by mass or less, the negative electrode active material can be prevented from lowering the battery capacity in addition to lowering the electric conductivity.

In the present invention, the silicon-based active material particles preferably contain at least one of an alkali metal, an alkaline earth metal, and a salt thereof. The above negative electrode active material, in which affinity of an alkali metal and an alkaline earth metal to a binder is high, can produce a negative electrode with high adhesiveness between the negative electrode active material layer and the negative electrode current collector to improve the capacity retention rate.

Illustrative examples of the alkali metal include sodium and potassium; illustrative examples of the alkaline earth metal include magnesium, calcium, and strontium. Illustrative examples of the salt thereof include polyacrylate salt, a salt of carboxymethyl cellulose, a salt of tetrafluoroborate, a salt of hexafluorophosphate, a fluoride salt, and carbonate.

In the present invention, it is more preferable that the negative electrode active material particles contain at least one of sodium, potassium, and a salt thereof as the alkali metal, and the sodium element or the potassium element is contained in a range of 10 ppm by mass to 200 ppm by mass on an individual basis with respect to the total amount of the negative electrode active material particles as described above. The above content makes it possible to produce a negative electrode in which the negative electrode active material layer hardly exfoliates while retaining the lithium conductivity of the carbon coating and the coating composed of a compound having a boron-fluorine bond and/or a compound having a phosphorous-fluorine bond on the surface of the silicon compound.

In the present invention, it is more preferable that the negative electrode active material particles contain at least one of magnesium, calcium, and a salt thereof as the alkaline earth metal, and the magnesium element or the calcium element is contained in a range of 5 ppm by mass to 50 ppm by mass with respect to the total amount of the negative electrode active material particles. The above content makes it possible to produce a negative electrode in which the negative electrode active material layer hardly exfoliates while retaining the lithium conductivity of the coating(s) on the surface of the silicon compound.

Such an alkali metal, an alkaline earth metal, and a salt thereof may be contained in the silicon-based active material particles by modifying silicon oxide powder while adhering polyacrylate salt containing these metal(s), for example.

In the present invention, the negative electrode active material preferably contains aluminum oxide on at least one surface of the surface of the silicon compound, the surface of the carbon coating, and the surface of the coating composed of at least one compound of a compound having a boron-fluorine bond and a compound having a phosphorous-fluorine bond. The aluminum element is preferably contained in a range of 50 ppm by mass to 500 ppm by mass with respect to the total amount of the silicon-based active material particles. Since aluminum oxide is excellent in chemical stability, the above negative electrode active material can produce slurry with good coating property. Since aluminum oxide is also excellent in durability and thermal stability, safety in charging and discharging of a battery can be enhanced. With a content in the above range, it is possible to exhibit the effect of coating property and battery safety while retaining the electric conductivity.

The aluminum oxide can be contained on the surface of the silicon-based active material particles by using a compound containing an aluminum element in a positive electrode of a bulk modification apparatus, which is used for modifying the silicon compound electrochemically. This allows an aluminum element eluted from the positive electrode in bulk modification to be deposited and oxidized on the surface of the silicon compound, the surface of the carbon coating, and/or the surface of the coating composed of a compound having a boron-fluorine bond and/or a compound having a phosphorous-fluorine bond. As a result, the aluminum oxide is contained in the surface of the silicon-based active material particles.

In the present invention, the silicon-based active material particles desirably contain at least one of chromium, iron, and copper in a range of 10 ppm by mass to 500 ppm by mass with respect to the total amount of the silicon-based active material. When the silicon-based active material particles contains such a metal element with high electric conductivity, the electric conductivity of the negative electrode active material can be improved. With the above content, the electric conductivity can be improved while preventing formation of alloy with silicon.

The chromium, iron, and/or copper may be contained in the silicon-based active material particles by mixing the raw material for producing the silicon compound with a material that contains chromium, iron, and/or copper. In this case, chromium, iron, and/or copper in the raw material Si vaporizes during the production of silicon compound and mixes into SiO during the precipitation thereof.

The amount of each element contained in the inventive negative electrode active material can be calculated by elemental analysis and so on. The method of elemental analysis includes inductively-coupled plasma optical emission spectrometry mass spectrometry (ICP-OES), for example.

In the present invention, the carbon coating preferably exhibits scattering peaks at 1330 cm$^{-1}$ and 1580 cm$^{-1}$ in Raman spectrometry and satisfies $0.7 < I_{1330}/I_{1580} < 2.0$ where $I_{1330}/I_{1580}$ is a ratio of intensity of these peaks. When the silicon compound has a carbon coating, it is possible to improve the electric conductivity between negative electrode active material particles to improve the battery performances. When the carbon coating has the ratio of intensity of $I_{1330}/I_{1580}$, it is possible to optimize the ratio of the carbon material with the diamond structure to the carbon material with the graphite structure contained in the carbon coating, and to improve the battery performances such as capacity retention rate and first efficiency.

The Raman spectrometry will now be described in detail. The micro-Raman analysis (Raman spectrometry) can obtain the ratio of a carbon material with the diamond structure (the carbon coating or the carbon-based material) to a carbon material with the graphite structure, from the Raman spectrum. More specifically, diamond exhibits a sharp peak at a Raman shift of 1330 cm$^{-1}$; graphite exhibits a sharp peak at a Raman shift of 1580 cm$^{-1}$. The ratio of the carbon material with the diamond structure to one with the graphite structure can be readily obtained from the ratio of the intensity of these peaks.

Diamond has high strength, high density, and are highly insulating; graphite is excellent in electric conductivity. In the silicon compound having carbon material satisfying the above intensity ratio on the surface, each of the above feature is optimized. As a result, it becomes a negative electrode active material that can prevent breakage of an electrode due to expansion and contraction of the electrode material caused by charging and discharging, and has an electric conductive network.

The method for forming the carbon coating includes a method in which the silicon compound is coated with a carbon material (a carbon-based compound) such as graphite.

The content of the carbon coating is preferably 5% by mass or more and 20% by mass or less with respect to a mass of the negative electrode active material particles (silicon-based active material particles).

When the content of the carbon coating is 5% by mass or more, the electric conductivity can be improved securely. When the content is 20% by mass or less, the battery performances are improved, and the battery capacity is increased. The coating method with a carbon-based compound is preferably, but not particularly limited to, sugar carbonization or pyrolysis of hydrocarbon gas. These methods can improve the coverage of the carbon coating on the surface of the silicon compound.

In the present invention, the silicon-based active material particles preferably contain an acid and a Li salt thereof. By containing the acid and the Li salt thereof, an alkaline component can be partially deactivated in producing an aqueous slurry, and the negative electrode is allowed to exhibit excellent capacity retention rate and first efficiency. The acid and the Li salt thereof contained in the negative electrode active material are desirably located around the silicon compound in the negative electrode. When the silicon compound contains a carbon coating as described above, in particular, the acid and the Li salt thereof are preferably detected from the outer periphery of the carbon coating. When the acid and the Li salt thereof are in a position closer to the silicon compound in a negative electrode, an effect for improving the battery performances is more enhanced.

The acid can be contained in the negative electrode active material particles by a method in which the silicon compound is dispersed into a protic solvent such as water and ethanol, and an acid or the aqueous solution thereof is added thereto; and a method in which the silicon compound is physically mixed with powder or liquid of the acid.

The location of the acid and the Li salt thereof can be detected by a method such as Scanning Electron Microscope-Energy Dispersive X-ray Spectroscopy (SEM-EDX), Time-of-Flight Secondary Ion Mass Spectrometry (TOF-SIMS), and measurement of Micro Raman/Infrared absorption analysis (IR).

In the present invention, a lower crystallinity of the silicon compound is better. More specifically, the silicon compound preferably exhibits a diffraction peak having a half width (2θ) of 1.2° or more that is attributable to a (111) crystal face and obtained by X-ray diffraction, and a crystallite size of 7.5 nm or less that is attributable to the crystal face. The silicon compound with low crystallinity makes it possible to improve the battery performances. It is also possible to form a stable Li compound in either or both of the interior and the surface of the silicon compound.

The median size of the silicon compound preferably ranges from 0.5 μm to 20 μm, but not particularly limited thereto. This range makes it easy to occlude and emit lithium ions and inhibits the breakage of the particles at charging and discharging. A median size of 0.5 μm or more then prevents the surface area from needlessly increasing and can thus reduce the battery irreversible capacity; a median size of 20 μm or less preferably inhibits the breakage of the particles and the creation of a new surface. It is to be noted that the ambient temperature in measuring the median size is set to 25° C.

The negative electrode active material layer may contain a negative electrode conductive additive in addition to the negative electrode active material. The negative electrode conductive additive may include any one or more of carbon black, acetylene black, graphite such as flaky graphite, ketjen black, carbon nanotube, and carbon nanofiber. These conductive additives are preferably particles having a median size smaller than that of the silicon compound.

In the present invention, a carbon-based active material may be contained in the negative electrode active material layer 12 in such a negative electrode as shown in FIG. 1 in addition to the inventive silicon-based active material. In this manner, the negative electrode active material layer 12 can reduce its electrical resistance and a stress due to its expansion at charging. Examples of the carbon-based active material include pyrolytic carbons, cokes, glassy carbon fiber, a baked organic polymeric compound, and carbon black.

In the inventive negative electrode, a ratio of the silicon-based active material is preferably 5% by mass or more with respect to the total amount of the carbon-based active material and the inventive negative electrode active material (silicon-based active material). Such a negative electrode for a non-aqueous electrolyte secondary battery prevents reduction in the first efficiency and the capacity retention rate. The upper limit of this content is preferably less than 90% by mass.

The negative electrode active material layer 12 may be formed by, for example, an application method. The application method is to mix the negative electrode active material particles and the binders, in addition to the conductive additive and the carbon material as needed, and disperse the resultant mixture into an organic solvent or water to apply the resultant to a subject.

[Method of Producing Negative Electrode]

The method of producing the inventive negative electrode will be now described. First, a method of producing negative electrode active material particles used for the negative electrode will be described. The method begins with a production of a silicon compound expressed by $SiO_x$ ($0.5 \leq x \leq 1.6$). Subsequently, the silicon compound is coated with a carbon coating on at least a part of the surface thereof. The silicon compound is then modified by inserting Li into the silicon compound and thereby forming a Li compound either or both of the surface and the interior of the silicon compound. At this stage, the negative electrode active material particles can be obtained by forming a coating composed of at least one compound selected from a compound having a boron-fluorine bond and a compound having a phosphorous-fluorine bond on at least a part of the surface of either or both of the silicon compound and the carbon coating. At this stage in the present invention, the surface is coated with the coating composed of at least one compound selected from a compound having a boron-fluorine bond and a compound having a phosphorous-fluorine bond in such a way that a boron element or a phosphorous element is contained in a range of 10 ppm by mass to 10000 ppm by mass with respect to the total amount of the negative electrode active material particles.

After producing the negative electrode active material particles in such a manner, the negative electrode active material particles are mixed with a conductive additive, a binder, and a solvent to form slurry. Then, the slurry is applied to the surface of a negative electrode current collector and dried to form a negative electrode active material layer. The negative electrode can be produced in the foregoing manner.

More specifically, the negative electrode can be produced by, for example, the following procedure.

First, a raw material capable of generating a silicon oxide gas is heated under an inert gas atmosphere or a reduced pressure at a temperature ranging from 900° C. to 1600° C. to produce the silicon oxide gas. The raw material is a mixture of metallic silicon powder and silicon dioxide powder. The mole ratio of the mixture preferably satisfies the relation of 0.8<metallic silicon powder/silicon dioxide powder<1.3, in consideration of the existence of oxygen on the metallic silicon powder surface and a minute amount of oxygen in a reactor. The Si-crystallites in the particles are controlled by adjustment of an arrangement range and a vaporization temperature, or heat treatment after the production. The produced gas is deposited on an adsorption plate. The temperature in the reactor is decreased to 100° C. or less and then a deposit is taken out. The deposit is then pulverized with a ball mill or a jet mill to form powder.

Then, the surface of the obtained powder material (silicon compound) is coated with a carbon layer.

Thermal CVD is desirable as a method to form the carbon coating on the surface of the obtained powder material. This thermal CVD is to fill a furnace in which the silicon oxide powder is placed with a hydrocarbon gas and heat the interior of the furnace. The pyrolysis temperature is preferably, but not particularly limited to, 1200° C. or less, more preferably 950° C. or less. This range enables inhibition of unintended disproportionation of the active material particles.

In the formation of the carbon coating by thermal CVD, adjustment of the pressure and temperature in the furnace, for example, allows the powder material to be coated with the carbon coating that satisfies a desired peak intensity ratio of $I_{1330}/I_{1580}$ in Raman spectrometry.

The hydrocarbon gas used in the thermal CVD preferably has a composition of $C_nH_m$ where $3 \geq n$, but is not particularly limited thereto, for this composition enables reduction in production cost and improvement in properties of a pyrolysis product.

Subsequently, the bulk of the powder material is modified. The bulk modification is preferably performed by inserting and extracting Li in an electrochemical manner. Although apparatus structure is not particularly limited, bulk modification can be performed with, for example, a bulk modification apparatus 20 shown in FIG. 2. The bulk modification apparatus 20 includes a bath 27 filled with an organic solvent 23, a positive electrode 21 (lithium source, modification source) provided within the bath 27 and connected to one terminal of a power source 26, a powder storage container 25 provided within the bath 27 and connected to the other terminal of the power source 26, and a separator 24 provided between the positive electrode 21 and the powder storage container 25. In the powder storage container 25, silicon compound (silicon oxide) powder 22 is stored. At this stage, the modification can be performed smoothly by adhering carbon particles to the silicon oxide powder 22 via a polyacrylate salt. As the polyacrylate salt, a polyacrylate salt that contains alkali metal or alkaline earth metal may be used, which can add alkali metal or alkaline earth metal to the silicon oxide powder 22.

In the bulk modification treatment, the carbon coating formed on the surface of the silicon compound makes it possible to decrease potential distribution on the surface of the silicon oxide powder 22 to control the whole silicon compound to be modified uniformly.

Examples of the organic solvent 23 in the bath 27 include ethylene carbonate, propylene carbonate, dimethyl carbonate, diethyl carbonate, ethylmethyl carbonate, fluoromethylmethyl carbonate, and difluoromethylmethyl carbonate. Examples of electrolyte salt contained in the organic solvent 23 include lithium hexafluorophosphate ($LiPF_6$) and lithium tetrafluoroborate ($LiBF_4$).

When the above electrochemical modification is performed with the compound having a boron-fluorine bond and the compound having a phosphorous-fluorine bond being added to the organic solvent 23, it is possible to coat the powder surface with the coating composed of at least one compound selected from a compound having a boron-fluorine bond and a compound having a phosphorous-fluorine bond simultaneously with modifying the silicon compound.

As the positive electrode 21, a Li foil or a Li-containing compound may be used. Examples of the Li-containing compound include lithium carbonate, lithium oxide, lithium cobalt oxide, olivine iron lithium, lithium nickel oxide, and vanadium lithium phosphate.

As described above, the silicon-based active material particles preferably contain an acid or a Li salt thereof, which can be achieved by acid treatment of the modified silicon compound. Examples of the acid treatment method include a method in which silicon-based active material particles are dispersed into a protic solvent such as water and ethanol, and acid or its aqueous solution is added thereto; and a method in which a silicon compound and powder or liquid of an acid are physically mixed.

When adding a carbon-based material with the median size being smaller than the silicon compound as a conductive additive, acetylene black can be selected and added thereto, for example.

<2. Lithium-Ion Secondary Battery>

A lithium-ion secondary battery using the above negative electrode for a lithium-ion secondary battery will be now described.

[Configuration of Laminate Film Secondary Battery]

The laminate film secondary battery 30 shown in FIG. 3 includes a wound electrode body 31 interposed between sheet-shaped outer parts 35. The wound body are formed by winding a positive electrode, a negative electrode, and a separator disposed between these electrodes. The electrode body may also be composed of a laminated part of the positive and negative electrodes, and a separator disposed between these electrodes. The electrode bodies of both types have a positive-electrode lead 32 attached to the positive electrode and a negative-electrode lead 33 attached to the negative electrode. The outermost circumference of the electrode bodies is protected by a protecting tape.

The positive-electrode lead and the negative-electrode lead, for example, extends from the interior of the outer parts 35 toward the exterior in one direction. The positive-electrode lead 32 is made of, for example, a conductive material such as aluminum; the negative-electrode lead 33 is made of, for example, a conductive material such as nickel or copper.

An example of the outer part 35 is a laminate film composed of a fusion-bond layer, a metallic layer, and a surface protecting layer stacked in this order. Two laminate films are fusion-bonded or stuck with an adhesive at the outer edge of their fusion-bond layers such that each fusion-bond layer faces the wound electrode body 31. The fusion-bond layer may be, for example, a film such as a polyethylene or polypropylene film; the metallic layer may be aluminum foil, for example; the protecting layer may be nylon, for example.

The space between the outer parts 35 and the positive and negative electrode leads is filled with close adhesion films 34 to prevent air from entering therein. Exemplary materials of the close adhesion films include polyethylene, polypropylene, and polyolefin resins.

[Positive Electrode]

The positive electrode has a positive electrode active material layer disposed on one side or both sides of a positive electrode current collector as in the negative electrode 10 shown in FIG. 1, for example.

The positive electrode current collector is made of, for example, a conductive material such as aluminum.

The positive electrode active material layer contains any one kind or two kinds of positive electrode materials that can occlude and emit lithium ions, and may contain a binder, a conductive additive, a dispersing agent, or other materials according to design. The same detailed description as described for the negative electrode binders and negative electrode conductive additive, for example, is then given for this binder and this conductive additive.

The positive electrode material is preferably a compound containing lithium. Examples of the lithium-containing compound include a complex oxide composed of lithium and a transition metal element, and a phosphate compound containing lithium and a transition metal element. Among them, a compound containing at least one of nickel, iron, manganese, and cobalt is preferable for the positive electrode material. The chemical formula of this compound is expressed by, for example, $Li_xM_1O_2$ or $Li_yM_2PO_4$, where $M_1$ and $M_2$ represent at least one kind of transition metal elements, and x and y represent a value varied depending on a charging or discharging status of a battery, which typically satisfy $0.05 \leq x \leq 1.10$ and $0.05 \leq y \leq 1.10$.

Examples of the complex oxide composed of lithium and a transition metal element include a lithium cobalt complex oxide ($Li_xCoO_2$), a lithium nickel complex oxide ($Li_xNiO_2$). Examples of the phosphate compound containing lithium and a transition metal element include a lithium iron phosphate compound ($LiFePO_4$), a lithium iron manganese phosphate compound ($LiFe_{1-u}Mn_uPO_4$ ($0<u<1$)). Use of these positive electrode materials enables a higher battery capacity and excellent cycle performance.

[Negative Electrode]

The negative electrode is configured as in the above negative electrode 10 for a lithium-ion secondary battery shown in FIG. 1, and, for example, has the negative electrode active material layer 12 disposed on both faces of the current collector 11. The negative electrode preferably has a negative-electrode charge capacity larger than a battery charge capacity (electrical capacitance) provided by the positive electrode active material, for this negative electrode itself can inhibit the precipitation of lithium metal.

The positive electrode active material layer is formed partially on both faces of the positive electrode current collector. The same is true of the negative electrode active material layer. Such a negative electrode may have, for example, an area at which the positive electrode active material layer is not present on the surface of the positive electrode current collector that the negative electrode active material layer faces. This area permits stable battery design.

The above area at which the positive and negative electrode active material layers do not face one another, a non-facing area, is hardly affected by charging and discharging. The status of the negative electrode active material layer is consequently retained since its formation. This enables repeatable investigation of the composition of negative electrode active material with high precision without being affected by charging and discharging.

[Separator]

The separator separates the positive electrode and the negative electrode, prevents short circuit current due to contact of these electrodes, and passes lithium ions therethrough. This separator may be made of, for example, a porous film of synthetic resin or ceramics, or two or more stacked porous films. Examples of the synthetic resin include polytetrafluoroethylene, polypropylene, and polyethylene.

[Electrolyte]

A part of the active material layers or the separator is impregnated with a liquid electrolyte (an electrolyte solution). The electrolyte is composed of electrolyte salt dissolved in a solvent and may contain other materials such as additives.

The solvent may be, for example, a non-aqueous solvent. Examples of the non-aqueous solvent include ethylene carbonate, propylene carbonate, butylene carbonate, dimethyl carbonate, diethyl carbonate, ethylmethyl carbonate, methylpropyl carbonate, 1,2-dimethoxyethane, and tetrahydrofuran.

Among these, ethylene carbonate, propylene carbonate, dimethyl carbonate, diethyl carbonate, or ethylmethyl carbonate, or the combination thereof is preferable. Such solvent enables better performances. The combination of a viscous solvent, such as ethylene carbonate or propylene carbonate, and a non-viscous solvent, such as dimethyl carbonate, ethylmethyl carbonate, or diethyl carbonate allows much better performances, for such a solvent improves the dissociation of electrolyte salt and ionic mobility.

The solvent preferably contains an unsaturated carbon bond cyclic carbonate as an additive, for this enables the formation of a stable coating on a negative electrode at charging and discharging and the inhibition of a decomposition reaction of the electrolyte. Examples of the unsaturated carbon bond cyclic carbonate include vinylene carbonate and vinyl ethylene carbonate.

In addition, the solvent preferably contains sultone (cyclic sulfonic acid ester) as an additive, for this enables improvement in chemical stability of a battery. Examples of the sultone include propane sultone and propene sultone.

In addition, the solvent preferably contains acid anhydride, for this enables improvement in chemical stability of the electrolyte. The acid anhydride may be, for example, propane disulfonic acid anhydride.

The electrolyte salt may contain, for example, at least one light metal salt such as lithium salt. Examples of the lithium salt include lithium hexafluorophosphate ($LiPF_6$), and lithium tetrafluoroborate ($LiBF_4$).

The content of the electrolyte salt in the solvent preferably ranges from 0.5 mol/kg or more and 2.5 mol/kg or less. This content enables high ionic conductivity.

[Manufacture of Laminate Film Secondary Battery]

Firstly, a positive electrode is produced with the above positive electrode material as follows. A positive electrode mixture is created by mixing the positive electrode material with as necessary the binder, the conductive additive, and other materials, and dispersed in an organic solvent to form slurry of the positive-electrode mixture. This slurry is then applied to a positive electrode current collector with a coating apparatus such as a die coater having a knife roll or a die head, and dried by hot air to obtain a positive electrode active material layer. The positive electrode active material layer is finally compressed with, for example, a roll press. The compression may be performed under heating. The compression and heating may be repeated multiple times.

Secondly, a negative electrode active material layer is formed on a negative electrode current collector to produce a negative electrode through the same procedure as in the above production of the negative electrode 10 for a lithium-ion secondary battery.

The positive electrode and the negative electrode are produced in the same way as above. When these electrodes are produced, the active material layers can be formed on both faces of the positive and negative electrode current collector. In both the electrodes, the length of these active material layers formed on the faces may differ from one another (See FIG. 1).

Then, an electrolyte is prepared. Subsequently, with ultrasonic welding etc., the positive electrode lead 32 is attached to the positive electrode current collector and the negative-electrode lead 33 is attached to the negative electrode current collector. The positive and negative electrodes and the separator interposed therebetween are stacked or wound to produce the wound electrode body and a protecting tape is stuck to the outermost circumference of the body. The electrode body is flattened. The film-shaped outer part 35 is folded in half to interpose the electrode body therebetween. The insulating portions of the outer part are stuck to one another by heat sealing such that one of the four sides is opened to house the wound electrode body. The close adhesion films 34 are inserted between the outer part 35 and the positive and negative electrode leads 32, 33. The prepared electrolyte is introduced from the open side in a prescribed amount to perform the impregnation of the electrolyte under a vacuum. The open side is stuck by vacuum heat sealing.

In this manner, the laminate film secondary battery 30 can be produced.

EXAMPLE

The present invention will be more specifically described below with reference to Examples of the present invention and Comparative Examples, but the present invention is not limited to these Examples.

Example 1-1

The laminate film secondary battery 30 shown in FIG. 3 was produced by the following procedure.

The procedure began with the production of a positive electrode. Positive electrode active materials of 95 mass parts of $LiCoO_2$, a lithium cobalt complex oxide, 2.5 mass parts of a positive electrode conductive additive, and 2.5 mass parts of a positive electrode binder (polyvinylidene fluoride, PVDF) were mixed to produce a positive-electrode mixture. The positive-electrode mixture was dispersed in an organic solvent (N-methyl-2-pyrrolidone, NMP) to form paste slurry. The slurry was applied to both surfaces of a positive electrode current collector with a coating apparatus having a die head and dried with a drying apparatus of hot-air type. The positive electrode current collector had a thickness of 15 μm. The resultant was finally compressed with a roll press.

Next, a negative electrode was produced. To produce of a negative electrode active material, a mixed raw material (also referred to as a raw material to be vaporized) of metallic silicon and silicon dioxide was placed in a reactor and subjected to deposition under a vacuum of 10 Pa. The deposit was sufficiently cooled and then taken out to pulverize the deposit with a ball mill. After adjusting the particle size of the obtained powder, thermal CVD was performed to give a carbon coating. The produced powder was bulk-modified by an electrochemical method in a mixed solvent having a propylene-carbonate-to-ethylene-carbonate ratio of 1:1 (including 1.3 mol/kg of lithium hexafluorophosphate: $LiPF_6$). This procedure treatment formed a Li compound in the silicon compound, together with a coating composed of a compound having a phosphorous-fluorine bond on a part of the surfaces of the silicon compound and the carbon coating. Incidentally, the phosphorous-fluorine bond in the coating was confirmed with XPS. In the bulk modification, the modification was performed while adhering carbon particles to the silicon oxide powders via a polyacrylate salt containing Na, K, Mg, and Ca. Subsequently, the modified silicon compound was soaked in polyacrylic acid slurry for acid treatment, and the silicon compound after the acid treatment was subjected to drying treatment under reduced pressure.

The silicon compound after acid treatment and drying contained $Li_4SiO_4$ and $Li_2SiO_3$ in the interior and lithium carbonate ($Li_2CO_3$) on the surface. The silicon compound $SiO_x$ had a "x" value of 0.5 and a median size $D_{50}$ of 5.2 μm. In the silicon compound, the half width (2θ) of the diffraction peak attributable to a (111) crystal face and obtainable by X-ray diffraction was 1.85°, and the crystallite size attributable to the (111) crystal face was 4.62 nm. The content of the carbon coating was 5% by mass with respect to the mass of the negative electrode active material particles, the film thickness of the carbon coating was 100 nm, the coverage of the carbon coating was 80% on the surface of the silicon compound. The negative electrode active material particles contained polyacrylic acid having Li conjugate salt as an acid and its Li salt, with the concentration being in a ratio of 10% by mass with respect to the silicon compound.

The content of each of P, B, Na, K, Mg, Ca, Al, Cr, Fe, and Cu elements contained in the negative electrode active material particles was quantified by using ICP-OES. As a pre-treatment, mixed aqueous solution of hydrofluoric acid and nitric acid (hydrofluoric acid:nitric acid=1:1) was added to 1 g of the negative electrode active material particles, which was dissolved with heating. After drying, aqueous nitric acid solution was added thereto to adjust the treated solution, which was served as a test portion.

As the result, the concentration of each element in the negative electrode active material particles was as follows: P: 2000 ppm by mass, B: 0 ppm by mass, Na: 20 ppm by mass, K: 30 ppm by mass, Mg: 25 ppm by mass, Ca: 30 ppm by mass, Al: 250 ppm by mass, Cr: 18 ppm by mass, Fe: 200 ppm by mass, Cu: 450 ppm by mass.

Then, the negative electrode active material particles (powders of the silicon-based compound after the acid treatment with polyacrylic acid and drying), a negative electrode binder (polyacrylic acid), conductive additive-1 (flaky graphite), conductive additive-2 (acetylene black), and conductive additive-3 (carbon nanotube) were mixed in a dried mass ratio of 90:4:2:1.5:2.5. This was diluted with water to form negative-electrode mixture slurry in a paste-form. Water was used as the solvent for the polyacrylic acid used as a negative electrode binder. Subsequently, the negative-electrode mixture slurry was applied to both surfaces of a negative electrode current collector with a coating apparatus and dried. The negative electrode current collector used was an electrolytic copper foil (thickness=15 μm). This was baked under a vacuum at 90° C. for 1 hour to form a negative electrode active material layer.

Next, an electrolyte was prepared by dissolving an electrolyte salt (lithium hexafluorophosphate, $LiPF_6$) to a solvent in which 4-fluoro-1,3-dioxolan-2-one (FEC), ethylene carbonate (EC), and dimethyl carbonate (DMC) were previously mixed. In this case, the composition of the solvents was FEC:EC:DMC=10:20:70 in a volume ratio, and the content of the electrolyte salt was to 1.0 mol/kg with respect to the solvent.

The secondary battery was assembled by the following procedure. An aluminum lead was first ultrasonic-welded to one end of the positive electrode current collector. A nickel lead was welded to one end of the negative electrode current collector. The positive electrode, a separator, the negative electrode, a separator were then stacked in this order and wound in a longitudinal direction to obtain a wound electrode body. The end of the wound part was fixed by a PET protecting tape. The separators were a 12 μm laminate film mainly composed of a porous polyethylene film interposed between porous polypropylene films. The electrode body was interposed between outer parts and the outer circumferences except one side were heat-sealed to house the electrode body therein. The outer parts were an aluminum laminate film composed of a nylon film, aluminum foil, and a polypropylene film stacked. The prepared electrolyte was poured from an open side to perform the impregnation of the electrolyte under a vacuum. The open side was stuck by heat sealing.

Examples 1-2 to 1-5 and Comparative Examples 1-1 and 1-2

A secondary battery was produced as in Example 1-1 except that oxygen amount in a bulk of the silicon compound was adjusted. The oxygen amount was adjusted by changing the temperature and the ratio of raw materials to be vaporized. Table 1 shows each value of "x" of the silicon compounds expressed by $SiO_x$ in Examples 1-1 to 1-5 and Comparative Examples 1-1 and 1-2.

The cycle performance (retention rate %) and the first charge and discharge performance (first efficiency %) of a secondary battery in Examples 1-1 to 1-5 and Comparative Examples 1-1 and 1-2 were investigated. The results are given in Table 1.

The cycle performance was investigated in the following manner: First, two cycles of charging and discharging were performed at 25° C. to stabilize the battery and the discharge capacity in the second cycle was measured. Next, the cycle of charging and discharging was repeated until the total number of cycles reached 100 cycles and the discharge capacity was measured every cycle. Finally, a capacity retention rate (hereinafter, also referred to as a retention rate) was calculated by dividing the discharge capacity in the 100-th cycle by the discharge capacity in the second cycle and multiply the resultant by 100 to express in %. The cycle conditions were as follows: The secondary batteries were charged with a constant current density of 2.5 mA/cm² until the voltage reached 4.3 V. After this voltage reached 4.3 V, the charging was continued while the current density became 0.25 mA/cm² at a constant voltage of 4.3 V. The batteries were then discharged with a constant current density of 2.5 mA/cm² until the voltage reached 3.0 V.

To investigate the first charge and discharge performance, a first efficiency (hereinafter, also referred to as an initial efficiency) was calculated. The first efficiency was calculated from the expression shown by First Efficiency (%)=

(First Discharge Capacity/First Charge Capacity)×100. The atmosphere temperate was the same as the cycle performance was investigated. The charging and discharging conditions were 0.2 times the conditions of the investigation of the cycle performance. That is, the secondary batteries were charged with a constant current density of 0.5 mA/cm$^2$ until the voltage reached 4.3 V. After this voltage reached 4.3 V, the charging was continued while the current density became 0.05 mA/cm$^2$ at a constant voltage of 4.3 V. The batteries were then discharged with a constant current density of 0.5 mA/cm$^2$ until the voltage reached 3.0 V.

Each retention rate and the first efficiency shown in the following Table 1 to Table 10 shows a retention rate and a first efficiency when the silicon-based active material was used alone as a negative electrode active material without containing a carbon-based active material such as natural graphite (with the average particle diameter of 20 μm, for example). This allows the measurement of variation in retention rate and first efficiency depending only on variations of silicon-based active material (such as variations in oxygen amount, Li compounds to be contained, metal to be contained, an acid and its Li salt to be contained, crystallinity, and median size), variations of the content of carbon coating or variations of the coating composed of at least one compound selected from a compound having a boron-fluorine bond and a compound having a phosphorous-fluorine bond.

TABLE 1

$D_{50}$ = 5.2 μm, XRD half width 2θ = 1.85°, Si(111) crystallite: 4.62 nm, $I_{1330}/I_{1580}$ = 1.2, C amount: 5% by mass, Thickness of C layer: 100 nm, Coverage of C layer: 80%, Li compounds: [Li$_4$SiO$_4$, Li$_2$SiO$_3$, Li$_2$CO$_3$], P amount: 2000 ppm by mass, B amount: 0 ppm by mass, Na amount: 20 ppm by mass, K amount: 30 ppm by mass, Mg amount: 25 ppm by mass, Ca amount: 30 ppm by mass, Al amount: 250 ppm by mass, Cr amount: 18 ppm by mass, Fe amount: 200 ppm by mass, Cu amount: 450 ppm by mass, Acid and its Li salt contained: polyacrylic acid (Li) 10% by mass, Binder: polyacrylic acid, Electrolyte: FEC:EC:DMC = 1:2:7 LiPF$_6$ 1.0 mol/kg, Positive electrode: LiCoO$_2$

| | X | Capacity retention rate (%) | First efficiency (%) |
|---|---|---|---|
| Comparative Example 1-1 | 0.3 | 65.3 | 83.0 |
| Example 1-1 | 0.5 | 80.2 | 81.3 |
| Example 1-2 | 0.7 | 81.3 | 80.4 |
| Example 1-3 | 0.9 | 81.5 | 79.0 |
| Example 1-4 | 1.2 | 81.1 | 77.6 |
| Example 1-5 | 1.6 | 81.0 | 76.0 |
| Comparative Example 1-2 | 1.8 | 73.0 | 70.1 |

As shown in Table 1, when the x value of the silicon compound expressed by SiO$_x$ was out of 0.5≤x≤1.6, the battery performances degraded. In comparative example 1-1, for example, although the first efficiency was improved because of lack of the oxygen amount (x=0.3), the retention rate significantly degraded. As shown in comparative example 1-2, on the other hand, the electric conductivity was lowered and both of the retention rate and the first efficiency were lowered when the oxygen amount was high (x=1.8).

Examples 2-1 to 2-6 and Comparative Example 2-1

A secondary battery was produced as in Example 1-3 basically except that the kind of Li compound contained therein was changed by changing the conditions of Li doping treatment (bulk modification), that is, the treatment conditions of Li doping in the silicon compound expressed by SiOx. Table 2 shows results obtained by investigating cycle performance and first charge and discharge performance of each secondary battery of Examples 2-1 to 2-6 and Comparative Example 2-1.

TABLE 2

SiOx (x = 0.9), $D_{50}$ = 5.2 μm, XRD half width 2θ = 1.85°, Si(111) crystallite: 4.62 nm, $I_{1330}/I_{1580}$ = 1.2, C amount; 5% by mass, Thickness of C layer: 100 nm, Coverage of C layer: 80%, P amount: 2000 ppm by mass, B amount: 0 ppm by mass, Na amount: 20 ppm by mass, K amount: 30 ppm by mass, Mg amount: 25 ppm by mass, Ca amount: 30 ppm by mass, Al amount: 250 ppm by mass, Cr amount: 18 ppm by mass, Fe amount: 200 ppm by mass, Cu amount: 450 ppm by mass, Acid and its Li salt contained: polyacrylic acid (Li) 10% by mass, Binder: polyacrylic acid, Electrolyte: FEC:EC:DMC = 1:2:7 LiPF$_6$ 1.0 mol/kg, Positive electrode: LiCoO$_2$

| | Li compound | Capacity retention rate (%) | First efficiency (%) |
|---|---|---|---|
| Comparative Example 2-1 | — | 77.0 | 69.0 |
| Example 2-1 | Li$_4$SiO$_4$ | 79.5 | 77.4 |
| Example 2-2 | Li$_2$SiO$_3$ | 79.3 | 77.5 |
| Example 2-3 | Li$_2$CO$_3$ | 79.8 | 77.5 |
| Example 2-4 | Li$_4$SiO$_4$, Li$_2$SiO$_3$ | 80.7 | 78.0 |
| Example 2-5 | Li$_4$SiO$_4$, Li$_2$CO$_3$ | 81.0 | 78.1 |
| Example 2-6 | Li$_2$SiO$_3$, Li$_2$CO$_3$ | 81.1 | 78.2 |
| Example 1-3 | Li$_4$SiO$_4$, Li$_2$SiO$_3$, Li$_2$CO$_3$ | 81.5 | 79.0 |

As shown in Table 2, the silicon compounds having the Li compounds in Examples 2-1 to 2-6 showed better capacity retention rate and first efficiency compared to the silicon compound in Comparative Example 2-1 that did not contain a Li compound. It is desirable to contain a Li compound such as Li$_2$CO$_3$, Li$_2$SiO$_3$, and Li$_4$SiO$_4$, in particular. It is desirable to contain much variety of these Li compounds to improve the cycle performance and the capacity retention rate.

Examples 3-1 to 3-26 and Comparative Examples 3-1 to 3-7

A secondary battery was produced as in Example 1-3 except for changing the phosphorous amount or the boron amount contained in the silicon compound as shown in Table 3. The phosphorous amount and the boron amount contained in the silicon compound were changed by changing the solute and the concentration of solute in the mixed solvent used for bulk modification of the silicon compound. It is to be noted that the silicon compound in Comparative Example 3-1 was bulk-modified by using a solution without containing phosphorous and boron, and did not contain phosphorous nor boron thereby. That is, the negative electrode active material particles in Comparative Example 3-1 did not contain a coating composed of at least one compound selected from a compound having a boron-fluorine bond and a compound having a phosphorous-fluorine bond. Table 3 shows results obtained by investigating cycle performance and first charge and discharge performance of each secondary battery of Examples 3-1 to 3-26 and Comparative Examples 3-1 to 3-7.

TABLE 3

SiOx (x = 0.9), $D_{50}$ = 5.2 μm, XRD half width 2θ = 1.85°, Si(111) crystallite: 4.62 nm, $I_{1330}/I_{1580}$ = 1.2, C amount: 5% by mass, Thickness of C layer: 100 nm, Coverage of C layer: 80%, Li compounds: [$Li_4SiO_4$, $Li_2SiO_3$, $Li_2CO_3$], Na amount: 20 ppm by mass, K amount: 30 ppm by mass, Mg amount: 25 ppm by mass, Ca amount: 30 ppm by mass, Al amount: 250 ppm by mass, Cr amount: 18 ppm by mass, Fe amount: 200 ppm by mass, Cu amount: 450 ppm by mass, Acid and its Li salt contained: polyacrylic acid (Li) 10% by mass, Binder: polyacrylic acid, Electrolyte: FEC:EC:DMC = 1:2:7 $LiPF_6$ 1.0 mol/kg, Positive electrode: $LiCoO_2$

|  | P content (ppm by mass) | B content (ppm by mass) | Capacity retention rate (%) | First efficiency (%) |
|---|---|---|---|---|
| Comparative Example 3-1 | 0 | 0 | 73.0 | 75.2 |
| Comparative Example 3-2 | 5 | 0 | 76.5 | 76.7 |
| Example 3-1 | 10 | 0 | 78.5 | 78.8 |
| Example 3-2 | 50 | 0 | 78.8 | 78.9 |
| Example 3-3 | 400 | 0 | 79.4 | 78.6 |
| Example 3-4 | 700 | 0 | 81.0 | 78.8 |
| Example 1-3 | 2000 | 0 | 81.5 | 79.0 |
| Example 3-5 | 4000 | 0 | 81.2 | 79.1 |
| Example 3-6 | 7000 | 0 | 79.7 | 79.0 |
| Example 3-7 | 9000 | 0 | 78.0 | 78.7 |
| Example 3-8 | 10000 | 0 | 78.0 | 78.5 |
| Comparative Example 3-3 | 15000 | 0 | 70.2 | 77.0 |
| Example 3-9 | 2000 | 5 | 81.1 | 78.7 |
| Example 3-10 | 2000 | 400 | 79.0 | 78.7 |
| Example 3-11 | 2000 | 2000 | 81.7 | 78.6 |
| Example 3-12 | 2000 | 7000 | 81.3 | 78.8 |
| Example 3-13 | 2000 | 8000 | 81.2 | 78.7 |
| Comparative Example 3-4 | 2000 | 15000 | 76.7 | 77.2 |
| Comparative Example 3-5 | 0 | 5 | 77.0 | 77.2 |
| Example 3-14 | 0 | 10 | 78.9 | 78.7 |
| Example 3-15 | 0 | 50 | 79.0 | 78.7 |
| Example 3-16 | 0 | 400 | 79.3 | 78.6 |
| Example 3-17 | 0 | 700 | 81.6 | 78.8 |
| Example 3-18 | 0 | 2000 | 81.8 | 78.8 |
| Example 3-19 | 0 | 4000 | 81.5 | 78.7 |
| Example 3-20 | 0 | 7000 | 79.7 | 78.9 |
| Example 3-21 | 0 | 9000 | 79.4 | 78.7 |
| Example 3-22 | 0 | 10000 | 79.3 | 78.6 |
| Comparative Example 3-6 | 0 | 15000 | 76.8 | 77.2 |
| Example 3-23 | 5 | 2000 | 81.9 | 78.7 |
| Example 3-24 | 400 | 2000 | 81.5 | 78.9 |
| Example 3-25 | 7000 | 2000 | 79.4 | 78.7 |
| Example 3-26 | 8000 | 2000 | 79.3 | 78.6 |
| Comparative Example 3-7 | 15000 | 2000 | 76.9 | 76.2 |

As shown in Table 3, the first efficiency and the capacity retention rate were degraded in Comparative Example 3-1, in which phosphorous and boron were not contained, that is, there is no coating composed of at least one compound selected from a compound having a boron-fluorine bond nor a compound having a phosphorous-fluorine bond. When the negative electrode active material particles contain a coating composed of at least one compound selected from a compound having a boron-fluorine bond and a compound having a phosphorous-fluorine bond, on the other hand, better capacity retention rate could be obtained compared to that of Comparative Example 3-1. This is because the phosphorous compound and/or the boron compound on the surface of the silicon compound or the carbon coating could prevent decompose reaction of a supporting salt in an electrolyte and could prevent increase of an irreversible component due to an increase of a resistant component or consumption of lithium ions.

The amounts of phosphorous element and boron element were also varied. In case of containing any one of these elements alone, good capacity retention rate could be obtained when the content was in a range of 10 ppm by mass to 10000 ppm by mass, and better capacity retention rate could be obtained when the content was in a range of 500 ppm by mass to 5000 ppm by mass. This is because an increase of content of phosphorous or boron enhanced the effect of preventing decompose reaction, but increased the resistant component, that is, significantly lowered the electric conductivity. In case of containing both of phosphorous and boron, good capacity retention rate could be obtained when the total content of these elements was in a range of 10 ppm by mass to 10000 ppm by mass, and better capacity retention rate could be obtained when the total content was in a range of 500 ppm by mass to 5000 ppm by mass.

Examples 4-1 to 4-12

A secondary battery was produced as in Example 1-3 except for changing the sodium content and the potassium content in the silicon compound. The sodium content and the potassium content were changed by changing the polyacrylate salt used for bulk modification and its amount to be added. Table 4 shows results obtained by investigating cycle performance and first charge and discharge performance of each secondary battery of Examples 4-1 to 4-12. Table 4 also shows each abrasion state of the negative electrode active material layer from the negative electrode current collector after 100 cycles of charging and discharging.

TABLE 4

SiOx (x = 0.9), $D_{50}$ = 5.2 μm, XRD half width 2θ = 1.85°, Si(111) crystallite: 4.62 nm, $I_{1330}/I_{1580}$ = 1.2, C amount: 5% by mass, Thickness of C layer: 100 nm, Coverage of C layer: 80%, Li compounds: [$Li_4SiO_4$, $Li_2SiO_3$, $Li_2CO_3$], P amount: 2000 ppm by mass, B amount: 0 ppm by mass, Mg amount: 0 ppm by mass, Ca amount: 0 ppm by mass, Al amount: 250 ppm by mass, Cr amount: 18 ppm by mass, Fe amount: 200 ppm by mass, Cu amount: 450 ppm by mass, Acid and its Li salt contained: polyacrylic acid (Li) 10% by mass, Binder: polyacrylic acid, Electrolyte: FEC:EC:DMC = 1:2:7 $LiPF_6$ 1.0 mol/kg, Positive electrode: $LiCoO_2$

|  | Na content (ppm by mass) | K content (ppm by mass) | Abrasion state | Capacity retention rate (%) | First efficiency (%) |
|---|---|---|---|---|---|
| Example 4-1 | 0 | 0 | Partly exfoliated | 77.7 | 78.0 |
| Example 4-2 | 5 | 0 | Partly exfoliated | 77.9 | 78.1 |
| Example 4-3 | 20 | 0 | None | 79.7 | 78.3 |
| Example 4-4 | 100 | 0 | None | 80.4 | 79.2 |
| Example 4-5 | 150 | 0 | None | 80.1 | 79.0 |
| Example 4-6 | 500 | 0 | None | 77.7 | 79.1 |
| Example 4-7 | 20 | 30 | None | 80.9 | 79.1 |
| Example 4-8 | 0 | 5 | Partly exfoliated | 77.5 | 77.6 |
| Example 4-9 | 0 | 30 | None | 80.0 | 78.1 |
| Example 4-10 | 0 | 100 | None | 80.2 | 78.6 |
| Example 4-11 | 0 | 150 | None | 81.1 | 78.7 |
| Example 4-12 | 0 | 500 | None | 77.6 | 78.8 |

As shown in Table 4, the capacity retention rate and the first efficiency changed in response to the variation in the sodium content and the potassium content in the silicon compound. The negative electrode active material was partly exfoliated from the negative electrode current collector when the content of sodium and potassium was less than 10 ppm by mass. The abrasion was tend to be observed at areas where curved surfaces were formed by winding, in particular. When the content is 10 ppm by mass or more, on the other hand, abrasion was not observed, and better retention rate and first efficiency were obtained thereby. This is because sodium and potassium on the surface of the silicon compound had high affinity for a binder to improve the adhesion between the negative electrode current collector and the negative electrode active material layer. When either content of sodium and potassium was changed with the other content being set to 0, good capacity retention rate and first efficiency were obtained when they each are in a range of 10 ppm by mass to 200 ppm by mass. In this range, it is possible to produce a negative electrode that hardly exfoliates to give good battery performance without causing lowering of lithium conductivity. When both sodium and potassium were contained (Examples 4-7), good capacity retention rate and first efficiency were obtained when each content was in a range of 10 ppm by mass to 200 ppm by mass.

Examples 5-1 to 5-12

A secondary battery was produced as in Example 1-3 except for changing the magnesium content and the calcium content in the silicon compound. In Example 5-12, the sodium content and the potassium content were changed in addition to the magnesium content and the calcium content in the silicon compound. The magnesium content, the calcium content, the sodium content, and the potassium content in the silicon compound were changed by changing the polyacrylate salt used for bulk modification and its amount to be added. Table 5 shows results obtained by investigating cycle performance and first charge and discharge performance of each secondary battery of Examples 5-1 to 5-12.

TABLE 5

SiOx (x = 0.9), $D_{50}$ = 5.2 µm, XRD half width 2θ = 1.85°, Si(111) crystallite: 4.62 nm, $I_{1330}/I_{1580}$ = 1.2, C amount: 5% by mass, Thickness of C layer: 100 nm, Coverage of C layer: 80%, Li compounds: [$Li_4SiO_4$, $Li_2SiO_3$, $Li_2CO_3$], P amount: 2000 ppm by mass, B amount: 0 ppm by mass, Al amount: 250 ppm by mass, Cr amount: 18 ppm by mass, Fe amount: 200 ppm by mass, Cu amount: 450 ppm by mass, Acid and its Li salt contained: polyacrylic acid (Li) 10% by mass, Binder: polyacrylic acid, Electrolyte: FEC:EC:DMC = 1:2:7 $LiPF_6$ 1.0 mol/kg, Positive electrode: $LiCoO_2$

| | Na content (ppm by mass) | K content (ppm by mass) | Mg content (ppm by mass) | Ca content (ppm by mass) | Abrasion state | Capacity retention rate (%) | First efficiency (%) |
|---|---|---|---|---|---|---|---|
| Example 4-1 | 0 | 0 | 0 | 0 | Partly exfoliated | 77.7 | 78.0 |
| Example 5-1 | 0 | 0 | 10 | 0 | None | 80.1 | 78.3 |
| Example 5-2 | 0 | 0 | 25 | 0 | None | 80.4 | 78.5 |
| Example 5-3 | 0 | 0 | 40 | 0 | None | 80.3 | 78.6 |
| Example 5-4 | 0 | 0 | 80 | 0 | None | 78.3 | 78.6 |
| Example 5-5 | 0 | 0 | 25 | 30 | None | 80.8 | 78.6 |
| Example 5-6 | 0 | 0 | 25 | 90 | None | 79.9 | 78.7 |
| Example 5-7 | 0 | 0 | 0 | 15 | None | 80.0 | 78.2 |
| Example 5-8 | 0 | 0 | 0 | 30 | None | 80.6 | 78.4 |
| Example 5-9 | 0 | 0 | 0 | 45 | None | 80.2 | 78.5 |
| Example 5-10 | 0 | 0 | 0 | 90 | None | 78.4 | 78.5 |
| Example 5-11 | 0 | 0 | 80 | 30 | None | 80.1 | 78.6 |
| Example 1-3 | 20 | 30 | 25 | 30 | None | 81.5 | 79.0 |
| Example 5-12 | 20 | 30 | 80 | 90 | None | 77.4 | 78.6 |

As shown in Table 5, the capacity retention rate and the first efficiency changed in response to the variation in the content of magnesium element and the content of calcium element in the silicon compound. The negative electrode active material was partly exfoliated from the negative electrode current collector when each content was less than 5 ppm by mass, but abrasion was not observed when the content was 5 ppm by mass or more. This is because magnesium and calcium on the surface of the silicon compound had high affinity for a binder to improve the adhesion between the negative electrode current collector and the negative electrode active material layer. When either content of magnesium and calcium was changed as in Examples 5-1 to 5-4 and Examples 5-7 to 5-10, good capacity retention rate was obtained when the contents were in a range of 5 ppm by mass to 50 ppm by mass on an individual basis. In this range, it is possible to produce a negative electrode that hardly exfoliates to give good battery performance without causing lowering of lithium conductivity. When sodium and potassium were contained, good capacity retention rate and first efficiency were obtained when each content was in a range of 5 ppm by mass to 50 ppm by mass.

Examples 6-1 to 6-5

A secondary battery was produced as in Example 1-3 except for changing the content of aluminum element on the surface of the silicon compound. The aluminum content was changed by controlling the potential in bulk modification. Table 6 shows results obtained by investigating cycle performance, first charge and discharge performance, and battery safety of each secondary battery of Examples 6-1 to 6-5. To evaluate the battery safety, nail penetration tests were also performed. Specifically, five pieces of secondary batteries charged to have 4.2 V were prepared in each Example to measure the number of the secondary batteries that satisfied the criterion of safety to pass the nail penetration test, in which a nail with the diameter of 2.7 mm was penetrated into each secondary battery at 5 mm/s.

TABLE 6

SiOx (x = 0.9), $D_{50}$ = 5.2 μm XRD half width 2θ = 1.85°, Si(111) crystallite: 4.62 nm, $I_{1330}/I_{1580}$ = 1.2, C amount: 5% by mass, Thickness of C layer: 100 nm, Coverage of C layer: 80%, Li compounds: [$Li_4SiO_4$, $Li_2SiO_3$, $Li_2CO_3$], P amount: 2000 ppm by mass, B amount: 0 ppm by mass, Na amount: 20 ppm by mass, K amount: 30 ppm by mass, Mg amount: 25 ppm by mass, Ca amount: 30 ppm by mass, Cr amount: 18 ppm by mass, Fe amount: 200 ppm by mass, Cu amount: 450 ppm by mass, Acid and its Li salt contained: polyacrylic acid (Li) 10% by mass, Binder: polyacrylic acid, Electrolyte: FEC:EC:DMC = 1:2:7 $LiPF_6$ 1.0 mol/kg, Positive electrode: $LiCoO_2$

| | Al content (ppm by mass) | Nailing test Number of passing | Capacity retention rate (%) | First efficiency (%) |
|---|---|---|---|---|
| Example 6-1 | 0 | 2 | 81.1 | 78.9 |
| Example 6-2 | 30 | 3 | 81.3 | 79.1 |
| Example 6-3 | 100 | 5 | 81.2 | 78.7 |
| Example 6-4 | 400 | 5 | 81.0 | 78.8 |
| Example 6-5 | 1000 | 5 | 79.3 | 78.5 |

As can be seen from Table 6, all of the secondary batteries satisfied the criterion of safety to pass the nail penetration test when the aluminum content was 50 ppm by mass or more as in Examples 6-3 to 6-5. This is because aluminum oxide on the surface of the silicon compound contributed to prevent an exothermic reaction at a short circuit in a battery. When the aluminum content was in a range of 50 ppm by mass to 500 ppm by mass, better capacity retention rate and first efficiency were obtained. In this range, the battery safety can be improved without lowering the electric conductivity.

Examples 7-1 to 7-5

A secondary battery was produced as in Example 1-3 except for changing the iron content, the copper content, and the chromium content in the silicon compound. Each content was changed by changing the raw material used for producing the silicon compound. Table 7 shows results obtained by investigating cycle performance and first charge and discharge performance of each secondary battery of Examples 7-1 to 7-5.

TABLE 7

SiOx (x = 0.9), $D_{50}$ = 5.2 μm, XRD half width 2θ = 1.85°, Si(111) crystallite: 4.62 nm, $I_{1330}/I_{1580}$ = 1.2, C amount: 5% by mass, Thickness of C layer: 100 nm, Coverage of C layer: 80%, Li compounds: [$Li_4SiO_4$, $Li_2SiO_3$, $Li_2CO_3$], P amount: 2000 ppm by mass, B amount: 0 ppm by mass, Na amount: 20 ppm by mass, K amount: 30 ppm by mass, Mg amount: 25 ppm by mass, Ca amount: 30 ppm by mass, Al amount: 250 ppm by mass, Acid and its Li salt contained: polyacrylic acid (Li) 10% by mass, Binder: polyacrylic acid, Electrolyte: FEC:EC:DMC = 1:2:7 $LiPF_6$ 1.0 mol/kg, Positive electrode: $LiCoO_2$

| | Fe content (ppm by mass) | Cr content (ppm by mass) | Cu content (ppm by mass) | Capacity retention rate (%) | First efficiency (%) |
|---|---|---|---|---|---|
| Example 7-1 | 5 | 3 | 7 | 78.0 | 79.1 |
| Example 7-2 | 200 | 3 | 7 | 80.9 | 79.0 |
| Example 7-3 | 5 | 18 | 7 | 80.1 | 79.3 |
| Example 7-4 | 5 | 3 | 450 | 81.1 | 79.1 |
| Example 1-3 | 200 | 18 | 450 | 81.5 | 79.0 |
| Example 7-5 | 1000 | 700 | 1000 | 78.0 | 78.1 |

As can be seen from Table 7, good capacity retention rate and first efficiency were obtained when the content of any one element of iron, copper, and chromium was in a range of 10 ppm by mass to 500 ppm by mass. In this range, the electric conductivity can be improved while preventing formation of alloy with silicon.

Examples 8-1 to 8-4

A secondary battery was produced as in Example 1-3 except for changing the carbon coating on the surface of the silicon compound in its content (the mass ratio of carbon coating with respect to the mass of the negative electrode active material particles), thickness (film thickness), and coverage. The variation of content, thickness, and coverage of the carbon coating can be controlled by adjusting the CVD time and the fluidity of the silicon compound powder in the CVD. Table 8 shows results obtained by investigating cycle performance and first charge and discharge performance of each secondary battery of Examples 8-1 to 8-4.

TABLE 8

SiOx (x = 0.9), $D_{50}$ = 5.2 μm, XRD half width 2θ = 1.85°, Si(111) crystallite: 4.62 nm, $I_{1330}/I_{1580}$ = 1.2, Li compounds: [$Li_4SiO_4$, $Li_2SiO_3$, $Li_2CO_3$], P amount: 2000 ppm by mass, B amount: 0 ppm by mass, Na amount: 20 ppm by mass, K amount: 30 ppm by mass, Mg amount: 25 ppm by mass, Ca amount: 30 ppm by mass, Al amount: 250 ppm by mass, Cr amount: 18 ppm by mass, Fe amount: 200 ppm by mass, Cu amount: 450 ppm by mass, Acid and its Li salt contained: polyacrylic acid (Li) 10% by mass, Binder: polyacrylic acid, Electrolyte: FEC:EC:DMC = 1:2:7 $LiPF_6$ 1.0 mol/kg, Positive electrode: $LiCoO_2$

| | Content (% by mass) | Film thickness (nm) | Coverage (%) | Retention rate (%) | First efficiency (%) |
|---|---|---|---|---|---|
| Example 8-1 | 0.05 | 5 | 16 | 77.9 | 78.0 |
| Example 8-2 | 0.2 | 8 | 40 | 78.2 | 78.4 |
| Example 1-3 | 5 | 100 | 80 | 81.5 | 79.0 |
| Example 8-3 | 15 | 220 | 100 | 80.7 | 78.8 |
| Example 8-4 | 30 | 490 | 100 | 79.1 | 78.4 |

As can be seen from Table 8, both of retention rate and first efficiency became better values when the coverage of carbon coating was in a range of 5% by mass to 20% by mass. When the content of carbon coating was 5% by mass or more, the electron conductivity of the silicon compound became good. When the content of carbon coating was 20% by mass or less, the ion conductivity became good. Accordingly, the capacity retention rate and first efficiency becomes good value when the content of carbon coating is in the range described above.

Examples 9-1 to 9-8

A secondary battery was produced as in Example 1-3 except that the crystallinity of the silicon compound was changed. The crystallinity can be changed by a heat treatment under a non-atmospheric condition after insertion and extraction of Li. The half width and crystallite size of each silicon-based active material of Examples 9-1 to 9-8 are shown in Table 9. Although Example 9-8 exhibited a half width of 20.221°, this value was obtained by fitting with analysis software, and the peak was not obtained substantially. Accordingly, the silicon-based active material in Example 9-8 was substantially amorphous. Table 9 shows results obtained by investigating cycle performance and first charge and discharge performance of each secondary battery of Examples 9-1 to 9-8.

TABLE 9

SiOx (x = 0.9), $D_{50}$ = 5.2 μm, $I_{1330}/I_{1580}$ = 1.2, C amount; 5% by mass, Thickness of C layer: 100 nm, Coverage of C layer: 80%, Li compounds: [$Li_4SiO_4$, $Li_2SiO_3$, $Li_2CO_3$], P amount: 2000 ppm by mass, B amount: 0 ppm by mass, Na amount: 20 ppm by mass, K amount: 30 ppm by mass, Mg amount: 25 ppm by mass, Ca amount: 30 ppm by mass, Al amount: 250 ppm by mass, Cr amount: 18 ppm by mass, Fe amount: 200 ppm by mass, Cu amount: 450 ppm by mass, Acid and its Li salt contained: polyacrylic acid (Li) 10% by mass, Binder: polyacrylic acid, Electrolyte: FEC:EC:DMC = 1:2:7 $LiPF_6$ 1.0 mol/kg, Positive electrode; $LiCoO_2$

|  | Half width 2θ (°) | Si (111) crystallite size (nm) | Capacity retention rate (%) | First efficiency (%) |
| --- | --- | --- | --- | --- |
| Example 9-1 | 0.756 | 11.42 | 78.6 | 81.1 |
| Example 9-2 | 0.796 | 10.84 | 78.8 | 80.7 |
| Example 9-3 | 1.025 | 8.55 | 79.4 | 80.1 |
| Example 9-4 | 1.218 | 7.21 | 80.5 | 79.7 |
| Example 1-3 | 1.845 | 4.62 | 81.5 | 79.0 |
| Example 9-5 | 2.257 | 3.77 | 81.3 | 78.6 |
| Example 9-6 | 2.593 | 3.29 | 81.7 | 78.3 |
| Example 9-7 | 10.123 | 1.524 | 82.0 | 77.5 |
| Example 9-8 | 20.221 | 0 | 82.5 | 76.9 |

As can be seen from Table 9, the capacity retention rate and the first efficiency changed in response to the variation in the crystallinity of the silicon compound. In particular, a high capacity retention rate was obtained by low crystallinity materials with a half width of 1.2° or more and a crystallite size of 7.5 nm or less, which is attributable to an Si(111) crystal face. The best capacity retention rate was obtained when the silicon compound was amorphous.

Examples 10-1 to 10-4

A secondary battery was produced as in Example 1-3 except that the median size of the silicon compound was adjusted. The median size was adjusted by changing the pulverizing time and classifying conditions in a step of producing the silicon compound. Table 10 shows results obtained by investigating cycle performance and first charge and discharge performance of each secondary battery of Examples 10-1 to 10-4.

TABLE 10

SiOx (x = 0.9), XRD half width 2θ = 1.85°, Si(111) crystallite: 4.62 nm, $I_{1330}/I_{1580}$ = 1.2, C amount: 5% by mass, Thickness of C layer: 100 nm, Coverage of C layer: 80%, Li compounds: [$Li_4SiO_4$, $Li_2SiO_3$, $Li_2CO_3$], P amount: 2000 ppm by mass, B amount: 0 ppm by mass, Na amount: 20 ppm by mass, K amount: 30 ppm by mass, Mg amount: 25 ppm by mass, Ca amount: 30 ppm by mass, Al amount: 250 ppm by mass, Cr amount: 18 ppm by mass, Fe amount: 200 ppm by mass, Cu amount: 450 ppm by mass, Acid and its Li salt contained: polyacrylic acid (Li) 10% by mass, Binder: polyacrylic acid, Electrolyte: FEC:EC:DMC = 1:2:7 $LiPF_6$ 1.0 mol/kg, Positive electrode: $LiCoO_2$

|  | $D_{50}$ (μm) | Capacity retention rate (%) | First efficiency (%) |
| --- | --- | --- | --- |
| Example 10-1 | 0.5 | 80.0 | 78.0 |
| Example 10-2 | 1.2 | 80.1 | 78.2 |
| Example 1-3 | 5.2 | 81.5 | 79.0 |
| Example 10-3 | 9.8 | 81.1 | 79.0 |
| Example 10-4 | 21.1 | 78.9 | 77.9 |

As can be seen from Table 10, the capacity retention rate and the first efficiency changed in response to the variation in the median size of the silicon compound. As shown in Examples 10-1 to 10-3, the capacity retention rate and the first efficiency were higher when the median size of the silicon compound ranged from 0.5 μm to 20 μm. In particular, a better capacity retention rate was obtained when the median size was 4 μm to 10 μm (Example 1-3 and Example 10-3).

Examples 11-1 to 11-7

In Examples 11-1 to 11-7, each secondary battery was produced as in Example 1-3 basically, but the portion of acid and its Li salt distributed in the negative electrode was changed by changing timing of acid treatment of the negative electrode active material particles. As the negative electrode active material, carbon-based active material (graphite) was added supplementally. The ratio of the content of carbon-based active material and the content of silicon compound in each negative electrode was fixed at 90:10 (mass ratio). That is, the ratio of the silicon compound was set to 10% by mass with respect to the total amount of the carbon-based active material and the silicon compound. Table 11 shows results obtained by investigating cycle performance and first charge and discharge performance of each secondary battery of Examples 11-1 to 11-7. Table 11 also shows main distribution of the acid and its Li salt.

TABLE 11

SiOx (x = 0.9), $D_{50}$ = 5.2 μm, XRD half width 2θ = 1.85°, Si(111) crystallite: 4.62 nm, $I_{1330}/I_{1580}$ = 1.2, C amount: 5% by mass, Thickness of C layer: 100 nm, Coverage of C layer: 80%, Li compounds: [$Li_4SiO_4$, $Li_2SiO_3$, $Li_2CO_3$], P amount: 2000 ppm by mass, B amount: 0 ppm by mass, Na amount: 20 ppm by mass, K amount: 30 ppm by mass, Mg amount: 25 ppm by mass, Ca amount: 30 ppm by mass, Al amount: 250 ppm by mass, Cr amount: 18 ppm by mass, Fe amount: 200 ppm by mass, Cu amount: 450 ppm by mass, Binder: polyacrylic acid, Electrolyte: FEC:EC:DMC = 1:2:7 $LiPF_6$ 1.0 mol/kg, Positive electrode: $LiCoO_2$, Active material: graphite:SiO = 90:10

|  | Acid & Li salt | Main distribution of location | Capacity retention rate (%) | First efficiency (%) |
|---|---|---|---|---|
| Example 11-1 | — | — | 84.1 | 86.1 |
| Example 11-2 | PAA | Peripheral surface of carbon coating on $SiO_x$ | 85.2 | 87.6 |
| Example 11-3 | CMC | Peripheral surface of carbon coating on $SiO_x$ | 84.1 | 85.7 |
| Example 11-4 | PAA | Boundary area between $SiO_x$ and graphite | 84.7 | 87.1 |
| Example 11-5 | PAA | Around graphite-graphite and $SiO_x$-graphite | 84.5 | 86.7 |
| Example 11-6 | PAA | Surface of negative electrode (surface of active material layer) | 84.1 | 86.1 |
| Example 11-7 | PAA | Surface of negative electrode current collector | 84.1 | 85.7 |

As can be seen from Table 11, good capacity retention rate and first efficiency were obtained when the negative electrode active material contained an acid and its Li conjugate salt. The capacity retention rate and the first efficiency were further improved when the acid and its Li conjugate salt contained in the negative electrode active material mainly located around the silicon-based active material particles in the negative electrode. When the acid and its Li conjugate salt located at a position closer to the silicon compound having a carbon coating in the negative electrode, the effect of improving the capacity retention rate and the first efficiency became more markedly. It was found that preferably results were obtained when the acid and its Li salt were detected on the peripheral surface of carbon coating, in particular.

Examples 12-1 to 12-4

A secondary battery was produced as in Example 11-2 except for changing the ratio of an intensity of the scattering peak at 1330 $cm^{-1}$ to that at 1580 $cm^{-1}$ of $I_{1330}/I_{1580}$ in Raman spectrometry by changing the state of the carbon coating on the surface of the silicon compound. Incidentally, the ratio of an intensity of the scattering peak was adjusted by changing the temperature and the gas pressure in the CVD. Table 12 shows results obtained by investigating cycle performance and first charge and discharge performance of each secondary battery of Examples 12-1 to 12-4.

TABLE 12

SiOx (x = 0.9), XRD half width 2θ = 1.85°, Si(111) crystallite: 4.62 nm, C amount: 5% by mass, Thickness of C layer: 100 nm, Coverage of C layer: 80%, Li compounds: [$Li_4SiO_4$, $Li_2SiO_3$, $Li_2CO_3$], P amount: 2000 ppm by mass, B amount: 0 ppm by mass, Na amount: 20 ppm by mass, K amount: 30 ppm by mass, Mg amount: 25 ppm by mass, Ca amount: 30 ppm by mass, Al amount: 250 ppm by mass, Cr amount: 18 ppm by mass, Fe amount: 200 ppm by mass, Cu amount: 450 ppm by mass, Acid and its Li salt contained: polyacrylic acid (Li) 10% by mass, Binder: polyacrylic acid, Electrolyte: FEC:EC:DMC = 1:2:7 $LiPF_6$ 1.0 mol/kg, Positive electrode: $LiCoO_2$, Active material: graphite:SiO = 90:10

|  | $I_{1330}/I_{1580}$ | Retention rate (%) | First efficiency (%) |
|---|---|---|---|
| Example 12-1 | 0.6 | 84.0 | 86.4 |
| Example 12-2 | 1.0 | 84.9 | 87.3 |
| Example 12-3 | 1.2 | 85.0 | 87.5 |
| Example 12-4 | 2.1 | 83.5 | 87.0 |

As shown in Table 12, the retention rate and the first efficiency could be improved when $I_{1330}/I_{1580}$ in Raman spectrometry was less than 2.0 since the electron conductivity was improved due to the surface that did not contain excess carbon components having disordered bond attributable to $I_{1330}$. When the $I_{1330}/I_{1580}$ value was larger than 0.7, the capacity retention rate could be improved since the surface did not contain excess carbon components such as graphite attributable to $I_{1580}$, thereby improving the ion conductivity and letting the carbon coating more expandable corresponding to the expansion of the silicon compound due to the insertion of Li.

It is to be noted that the present invention is not limited to the foregoing embodiment. The embodiment is just an exemplification, and any examples that have substantially the same feature and demonstrate the same functions and effects as those in the technical concept described in claims of the present invention are included in the technical scope of the present invention.

The invention claimed is:
1. A negative electrode active material for a non-aqueous electrolyte secondary battery, comprising:
    negative electrode active material particles that contain a silicon compound containing a Li compound;
    wherein:
    the silicon compound is represented by formula $SiO_x$, where 0.5≤x≤1.6,
    the silicon compound is at least partially coated with a first coating that is a carbon coating,
    the negative electrode active material particles are coated with a second coating that is composed of at least one compound selected from the group consisting of a compound having a boron-fluorine bond and a compound having a phosphorous-fluorine bond, where the second coating coats at least a part of a surface of the silicon compound, at least a part of a surface of the first coating, or both,
    the negative electrode active material particles contain:
    (i) a boron element or a phosphorous element in a range of 10 ppm by mass to 10000 ppm by mass with respect to a total amount of the negative electrode active material particles, and
    (ii) at least one selected from the group consisting of sodium, potassium, magnesium, calcium, and a salt thereof, where:
        (a) the sodium element or the potassium element is present in a range of 10 ppm by mass to 200 ppm by mass on an individual basis with respect to the total amount of the negative electrode active material particles, and/or (b) the magnesium element or the calcium element is present in a range of 5 ppm by mass to 50 ppm by mass with respect to the total amount of the negative electrode active material particles.

2. The negative electrode active material for a non-aqueous electrolyte secondary battery according to claim 1, wherein the negative electrode active material particles contain the boron element or the phosphorous element in a range of 500 ppm by mass to 5000 ppm by mass with respect to the total amount of the negative electrode active material particles.

3. The negative electrode active material for a non-aqueous electrolyte secondary battery according to claim 1, wherein one or more of the following: (i) the surface of the silicon compound, (ii) the surface of the first coating, and (iii) the surface of second coating contains aluminum oxide, and an amount of an aluminum element is in a range of 50 ppm to 500 ppm with respect to the total amount of the negative electrode active material particles.

4. The negative electrode active material for a non-aqueous electrolyte secondary battery according to claim 1, wherein the negative electrode active material particles further contain at least one selected from the group consisting of chromium, iron, and copper in a range of 10 ppm by mass to 500 ppm by mass with respect to the total amount of the negative electrode active material particles.

5. The negative electrode active material for a non-aqueous electrolyte secondary battery according to claim 1, wherein the negative electrode active material particles further contain an acid and a Li salt thereof, and the acid and the Li salt thereof are on an outer periphery of the carbon coating.

6. The negative electrode active material for a non-aqueous electrolyte secondary battery according to claim 1, wherein the silicon compound contains in its interior at least one Li compound selected from the group consisting of $Li_2SiO_3$, $Li_6Si_2O_7$, and $Li_4SiO_4$.

7. The negative electrode active material for a non-aqueous electrolyte secondary battery according to claim 1, wherein the negative electrode active material particles are produced by a process including an electrochemical method.

8. The negative electrode active material for a non-aqueous electrolyte secondary battery according to claim 1, wherein the carbon coating exhibits scattering peaks at 1330 $cm^{-1}$ and 1580 $cm^{-1}$ in Raman spectrometry and satisfies $0.7<I_{1330}/I_{1580}<2.0$ where $I_{1330}/I_{1580}$ is a ratio of an intensity of the scattering peak at 1330 $cm^{-1}$ to that at 1580 $cm^{-1}$.

9. The negative electrode active material for a non-aqueous electrolyte secondary battery according to claim 1, wherein a content of the carbon coating is 5.0% by mass or more and 20% by mass or less with respect to a mass of the negative electrode active material particles.

10. The negative electrode active material for a non-aqueous electrolyte secondary battery according to claim 1, wherein the silicon compound exhibits a diffraction peak having a half width (2θ) of 1.2° or more, the diffraction peak being attributable to a Si (111) crystal face and obtained by X-ray diffraction, and a crystallite size attributable to the crystal face is 7.5 nm or less.

11. The negative electrode active material for a non-aqueous electrolyte secondary battery according to claim 1, wherein the silicon compound has a median size $D_{50}$ of 0.5 μm or more and 20 μm or less.

12. A negative electrode for a non-aqueous electrolyte secondary battery comprising a negative electrode active material for a non-aqueous electrolyte secondary battery according to claim 1 and a carbon-based active material.

13. The negative electrode for a non-aqueous electrolyte secondary battery according to claim 12, wherein a ratio of the negative electrode active material is 5% by mass or more with respect to a total amount of the carbon-based active material and the negative electrode active material.

14. A non-aqueous electrolyte secondary battery comprising a negative electrode for a non-aqueous electrolyte secondary battery according to claim 12.

* * * * *